(12) United States Patent
Scenini et al.

(10) Patent No.: US 9,918,367 B1
(45) Date of Patent: Mar. 13, 2018

(54) CURRENT SOURCE REGULATION

(71) Applicant: Infineon Technologies AG, Neubiberg (DE)

(72) Inventors: Andrea Scenini, Montegrotto Terme (IT); Adolfo De Cicco, Castel d'Azzano (IT); Rosario Chiodo, Selvazzano Dentro (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/355,779

(22) Filed: Nov. 18, 2016

(51) Int. Cl.
*H05B 37/00* (2006.01)
*H05B 33/08* (2006.01)
*B60Q 1/14* (2006.01)
*F21V 23/00* (2015.01)
*F21Y 115/10* (2016.01)

(52) U.S. Cl.
CPC ....... *H05B 33/0884* (2013.01); *B60Q 1/1415* (2013.01); *H05B 33/0809* (2013.01); *H05B 33/0815* (2013.01); *H05B 33/0845* (2013.01); *H05B 33/0851* (2013.01); *F21V 23/005* (2013.01); *F21Y 2115/10* (2016.08)

(58) Field of Classification Search
CPC ............ H05B 33/0809; H05B 33/0815; H05B 33/0845; H05B 33/0851
USPC .................................................. 315/186, 192
See application file for complete search history.

(56) References Cited

U.S. PATENT DOCUMENTS

| 5,184,114 A | 2/1993 | Brown |
| 5,798,535 A | 8/1998 | Huang et al. |
| 5,850,205 A | 12/1998 | Blouin |
| 5,866,922 A | 2/1999 | Huang et al. |
| 6,285,084 B1 | 9/2001 | Hikita et al. |
| 6,380,687 B1 | 4/2002 | Yamazaki |
| 6,806,497 B2 | 10/2004 | Jo |
| 7,265,572 B2 | 9/2007 | Osada |

(Continued)

FOREIGN PATENT DOCUMENTS

| DE | 2752105 A1 | 5/1979 |
| DE | 3813664 A1 | 11/1988 |

(Continued)

OTHER PUBLICATIONS

Final Rejection from U.S. Appl. No. 14/719,035, dated Feb. 23, 2017, 16 pp.

(Continued)

*Primary Examiner* — Tung X Le
(74) *Attorney, Agent, or Firm* — Shumaker & Sieffert, P.A.

(57) ABSTRACT

Current source regulation circuitry that is arranged in a loop with power supply circuitry and current source circuitry. The current source regulation circuitry is configured to control the magnitude of supply voltage output by the power supply circuitry in order to maintain the voltage drop across each one current source of the current source circuitry to within a bounded range of voltage values. The bounded range of voltage values may be defined such that each one current source of the current source circuitry can properly regulate a drive current that is supplied to a corresponding light source coupled thereto, and such that the amount of power dissipated by each current source of the current source circuitry during operation is maintained within an acceptable range.

16 Claims, 15 Drawing Sheets

(56) References Cited

U.S. PATENT DOCUMENTS

| | | |
|---|---|---|
| 7,271,791 B2 | 9/2007 | Yamazaki |
| 7,274,351 B2 | 9/2007 | Washio et al. |
| 7,372,440 B2 | 5/2008 | Ota et al. |
| 7,518,393 B2 | 4/2009 | Shirasaki et al. |
| 7,525,530 B2 | 4/2009 | Takafuji et al. |
| 7,602,215 B2 | 10/2009 | Osame et al. |
| 8,169,163 B2 | 5/2012 | Kang et al. |
| 8,188,942 B2 | 5/2012 | Yoo et al. |
| 8,199,074 B2 | 6/2012 | Wang et al. |
| 8,314,756 B2 | 11/2012 | Rankov et al. |
| 8,692,758 B2 | 4/2014 | Matsuda et al. |
| 9,124,260 B2 | 9/2015 | Furuta et al. |
| 9,299,302 B2 | 3/2016 | Washio |
| 9,355,596 B2 | 5/2016 | Shin et al. |
| 9,361,823 B2 | 6/2016 | Takahama et al. |
| 2003/0132447 A1 | 7/2003 | Yukimoto |
| 2004/0008072 A1 | 1/2004 | Kimura et al. |
| 2004/0208011 A1* | 10/2004 | Horiuchi ............... G09G 3/30 362/458 |
| 2005/0088380 A1 | 4/2005 | Bulovic et al. |
| 2005/0200291 A1 | 9/2005 | Naugler, Jr. et al. |
| 2005/0206606 A1 | 9/2005 | Takafuji et al. |
| 2005/0245046 A1 | 11/2005 | Takafuji et al. |
| 2005/0285822 A1 | 12/2005 | Reddy et al. |
| 2006/0007076 A1 | 1/2006 | Sheats et al. |
| 2006/0007204 A1 | 1/2006 | Reddy et al. |
| 2006/0007205 A1 | 1/2006 | Reddy et al. |
| 2006/0007206 A1 | 1/2006 | Reddy et al. |
| 2006/0007248 A1 | 1/2006 | Reddy et al. |
| 2006/0007249 A1 | 1/2006 | Reddy et al. |
| 2006/0064612 A1 | 3/2006 | Knapp et al. |
| 2007/0008297 A1 | 1/2007 | Bassetti |
| 2007/0171271 A1 | 7/2007 | Wey et al. |
| 2008/0111888 A1 | 5/2008 | Tewinkle et al. |
| 2008/0284714 A1 | 11/2008 | Wu et al. |
| 2009/0033643 A1 | 2/2009 | Schmidt et al. |
| 2009/0191671 A1 | 7/2009 | Takafuji et al. |
| 2009/0251391 A1 | 10/2009 | Ng et al. |
| 2009/0269907 A1 | 10/2009 | Takafuji et al. |
| 2010/0144073 A1 | 6/2010 | Louwsma et al. |
| 2010/0164844 A1 | 7/2010 | Lin et al. |
| 2010/0188720 A1 | 7/2010 | Nakamura et al. |
| 2010/0201275 A1 | 8/2010 | Cok et al. |
| 2010/0213467 A1 | 8/2010 | Lee et al. |
| 2010/0277400 A1 | 11/2010 | Jeong |
| 2010/0328288 A1 | 12/2010 | Kimura et al. |
| 2011/0122172 A1 | 5/2011 | Tanigawa et al. |
| 2011/0133673 A1 | 6/2011 | Ryu et al. |
| 2011/0242027 A1 | 10/2011 | Chang |
| 2012/0242230 A1* | 9/2012 | Jin ..................... H05B 33/0815 315/121 |
| 2014/0070188 A1 | 3/2014 | Park et al. |
| 2014/0093252 A1 | 4/2014 | Yamashita et al. |
| 2014/0097762 A1* | 4/2014 | Ide ..................... H05B 33/0806 315/192 |
| 2016/0109505 A1 | 4/2016 | Capodivacca et al. |
| 2016/0262232 A1* | 9/2016 | Fukui .................... B60Q 1/04 |
| 2016/0345397 A1 | 11/2016 | De Cicco et al. |
| 2017/0238385 A1* | 8/2017 | Sasaki ............... H05B 33/0845 349/61 |

FOREIGN PATENT DOCUMENTS

| | | |
|---|---|---|
| DE | 3931262 A1 | 3/1991 |
| DE | 202012104937 U1 | 1/2013 |
| EP | 0180479 A2 | 5/1986 |
| EP | 0282653 A1 | 9/1988 |
| EP | 0335553 A2 | 10/1989 |
| EP | 0504575 A2 | 9/1992 |
| EP | 0683526 A1 | 11/1995 |
| EP | 0683527 A1 | 11/1995 |
| EP | 0702347 A1 | 3/1996 |
| EP | 0785580 A2 | 7/1997 |
| EP | 0899620 A1 | 3/1999 |
| EP | 2065781 A2 | 6/2009 |
| EP | 2211386 A2 | 7/2010 |
| EP | 2387021 A1 | 11/2011 |
| EP | 2763174 A2 | 8/2014 |
| WO | 9001803 A1 | 2/1990 |
| WO | 9200196 A1 | 1/1992 |
| WO | 2004053824 A1 | 6/2004 |
| WO | 2005081810 A2 | 9/2005 |
| WO | 2006010615 A1 | 2/2006 |
| WO | 2006113922 A2 | 10/2006 |
| WO | 2006121914 A2 | 11/2006 |
| WO | 2010046638 A1 | 4/2010 |
| WO | 2010091380 A1 | 8/2010 |
| WO | 2013170460 A1 | 11/2013 |
| WO | 2014033671 A2 | 3/2014 |
| WO | 2014099499 A1 | 6/2014 |

OTHER PUBLICATIONS

Response to Office Action dated Jul. 7, 2016, from U.S. Appl. No. 14/719,035, filed Nov. 7, 2016, 11 pp.

Response to Office Action dated Jun. 22, 2016, 2016, from U.S. Appl. No. 14/718,956, filed Nov. 22, 2016, pp.

U.S. Appl. No. 14/718,956, filed May 21, 2015, filed by Adolfo DeCicco.

U.S. Appl. No. 14/719,035, filed May 21, 2015, filed by Andrea Scenini.

Office Action from U.S. Appl. No. 14/718,956, dated Jun. 22, 2016, 14 pp.

Office Action from U.S. Appl. No. 14/719,035, dated Jul. 7, 2016, 15 pp.

Notice of Allowance from U.S. Appl. No. 14/719,035, dated Jun. 7, 2017, 12 pp.

* cited by examiner

US 9,918,367 B1

CURRENT SOURCE REGULATION

SUMMARY

The present disclosure is directed to current source regulation circuitry that is arranged in a loop with power supply circuitry and current source circuitry. In general, the current source circuitry may comprise a relatively large number of current sources (e.g., greater than 1000 current sources), where each one of the current sources is configured to drive an LED (Light Emitting Diode). A headlamp for an automobile, together with supporting power and drive circuitry, is an example of such a system and, in practice, a supply voltage generated by the power supply circuitry is used to power each one current source of the current source circuitry, and the current source regulation circuitry is configured to control the magnitude of the supply voltage in order to maintain the voltage drop across each one of the current sources to within a bounded range of voltage values. As an example, the current source regulation circuitry may include or comprise:

- monitor circuitry that is configured to, for at least one LED driver (i.e., current source) of a plurality of LED drivers, generate a signal to indicate that a voltage drop across the at least one LED driver is outside of a bounded range of voltage values, wherein the voltage drop is determined based on a drive voltage that is output by the at least one LED driver to source current to an LED that is coupled thereto and a supply voltage that is output by a power supply to each LED driver of the plurality of LED drivers; and
- controller circuitry that is configured to: receive the signal from the monitor circuitry and, based on the signal, adjust the supply voltage that is output by the power supply to force the voltage drop across the at least one LED driver to within the bounded range of voltage values.

Advantageously, the bounded range of voltage values may be selectively or programmatically defined such that each one current source of the current source circuitry can properly regulate a drive current that is supplied to a corresponding LED coupled thereto, and such that the amount of power dissipated by each current source of the current source circuitry during operation is maintained within an acceptable range.

DETAILED DESCRIPTION

Figure 1:
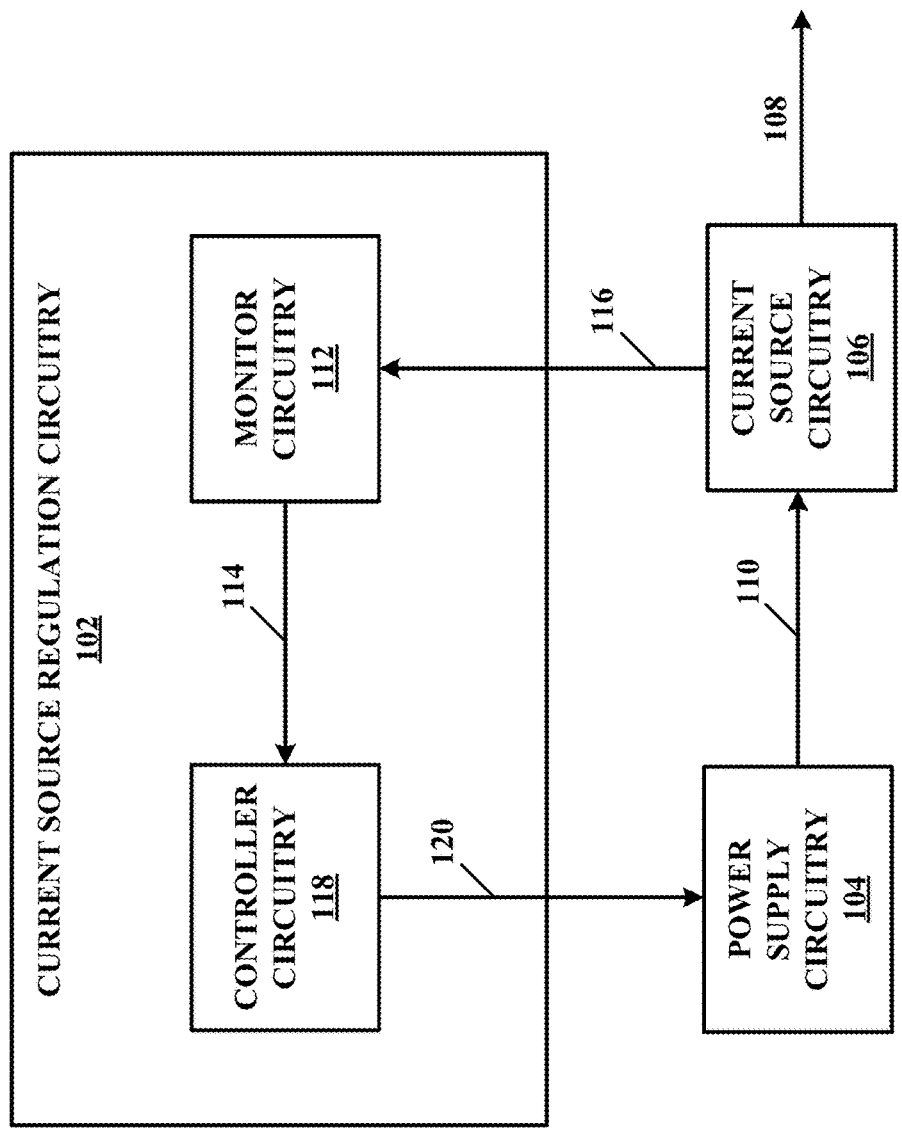
FIG. 1 shows an exemplary block diagram of current source regulation circuitry arranged in an example topology in accordance with the disclosure.

FIG. 1 shows an exemplary block diagram of current source regulation circuitry 102 arranged in an example topology in accordance with the disclosure. Specifically, current source regulation circuitry 102 is arranged in a loop with power supply circuitry 104 and current source circuitry 106. In general, current source circuitry 106 may comprise a relatively large number of current sources (e.g., greater than 1000 current sources), where each one of the current sources is configured to output a current to drive an LED, represented by a signal 108 that is output by current source circuitry 106. A headlamp for an automobile, together with supporting power and drive circuitry, is an example of such a system.

In practice, a supply voltage 110 generated by power supply circuitry 104 is used to power each one current source of current source circuitry 106, and current source regulation circuitry 102 is configured to control the magnitude of supply voltage 110 in order to maintain the voltage drop across each one current source of current source circuitry 106 to within a bounded range of voltage values.

More specifically, monitor circuitry 112 of current source regulation circuitry 102 is configured to generate a signal 114 to indicate that a voltage drop across any particular current source of current source circuitry 106, based on a signal 116 received by monitor circuitry 112 as shown FIG. 1, is outside of a bounded range of voltage values. In this example, the voltage drop is determined based on a drive voltage that is output by a particular current source of current source circuitry 106 (to drive an LED coupled thereto, represented by signal 108) and the supply voltage 110 generated by power supply circuitry 104.

Controller circuitry 118 of current source regulation circuitry 102 is configured to receive signal 114 from monitor circuitry 112 and, based on signal 114, output a signal 120 to control the magnitude of supply voltage 110 in order to maintain the voltage drop across each current source of current source circuitry 106 to within the bounded range of voltage values. Advantageously, the bounded range of voltage values may be defined such that each one current source of current source circuitry 106 can properly regulate a drive current to drive an LED coupled thereto, and such that the amount of power dissipated by each current source of current source circuitry 106 during operation is maintained within an acceptable range. An example of such an implementation is illustrated in FIG. 2.

Figure 2:
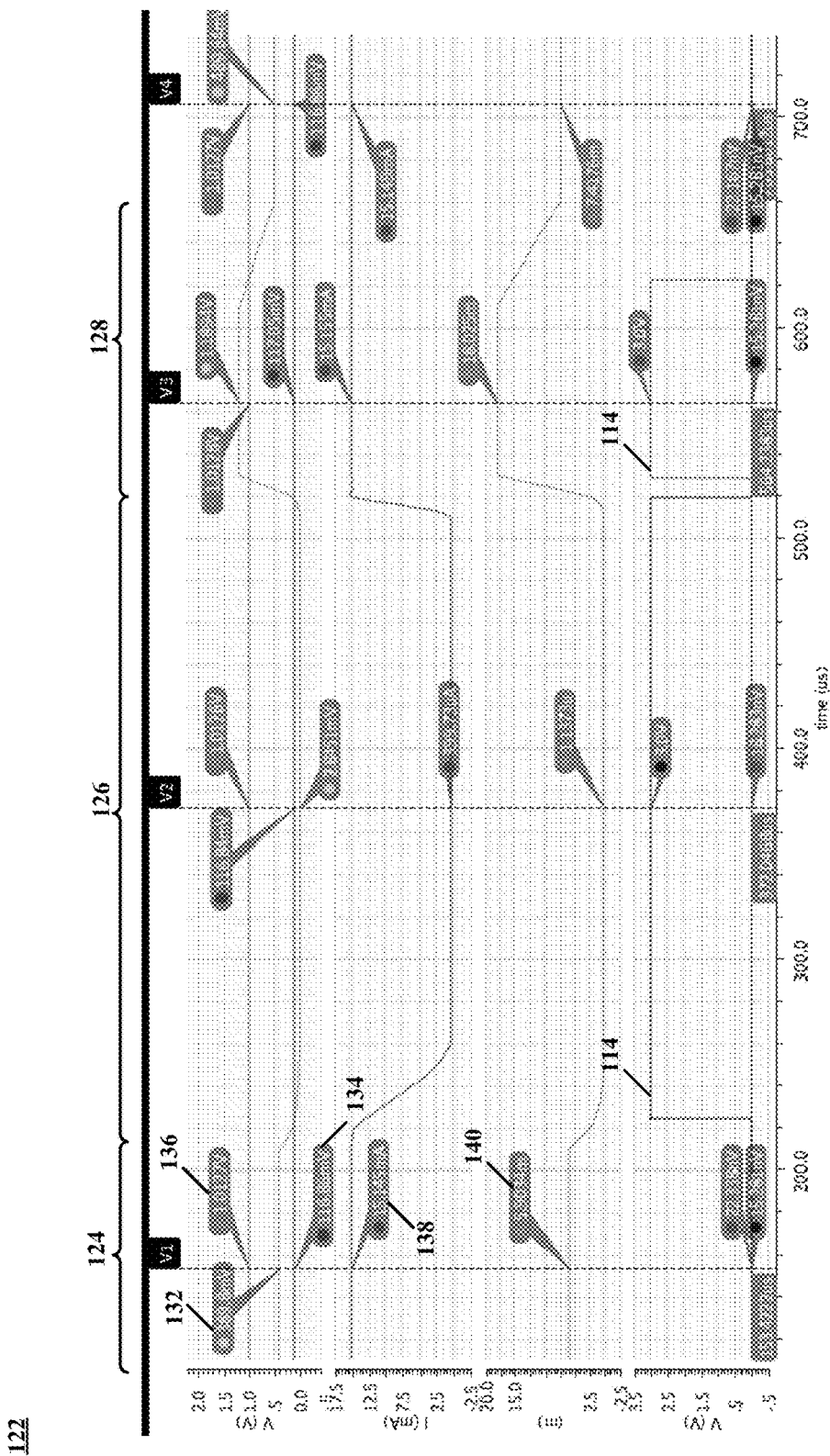
FIG. 2 shows an exemplary dataset that demonstrates response of the current source regulation circuitry of FIG. 1.

FIG. 2 shows an example dataset 122 that is segmented into a first phase 124, a second phase 126 and a third phase 128.

During first phase 124, a particular one current source of current source circuitry 106 (see FIG. 1) is properly regulating drive current. This is because voltage drop 132 across the particular one current source is about 390 mV (see marker V1), and 390 mV is between a range of voltage values bounded by a lower threshold or bound 134 and an upper threshold or bound 136. In practice, a voltage value for each one of lower bound 134 and upper bound 136 may defined as desired, and may be implementation-specific. In this example, however, a voltage value for lower bound 134 is about (i.e., approximately, but not precisely) 117 mV, and 117 mV may correspond to a minimum voltage value for the particular one current source to properly regulate drive current. In contrast, a voltage value for upper bound 136 is about 1V, and 1V may correspond to a maximum voltage value for the particular one current source to properly regulate drive current without excess or undesired power dissipation.

During first phase 124, the particular one current source of current source circuitry 106 is properly regulating drive current without excess or undesired power dissipation because drive current 138 during first phase 124 (see marker V1) is about 15 mA (as expected) and power dissipation 140 is at a reasonable value of about 6 mW. The value of about 6 mW is reasonable because across each one of 1000 current sources, for example, 6 mW power dissipation per current source may not generate a substantial amount of heat or be considered overly wasteful in power supply terms.

At onset of second phase 126 (at about t=210 μs), however, an unexpected drop in magnitude of supply voltage 110 (see FIG. 1) occurs, and therefore voltage drop 132 across the particular one current source has decreased to about 3 mV (see marker V2), which is less than the voltage value for lower bound 134. In this example, monitor circuitry 112 (see FIG. 1) of current source regulation circuitry 102 generates signal 114 at about t=220 μs as voltage drop 132 crosses lower bound 134. In response, controller circuitry 118 (see FIG. 1) of current source regulation circuitry 102 generates signal 120 to adjust the magnitude of supply voltage 110 so that voltage drop 132 across the particular one current source is regulated back to a value within lower bound 134 and upper bound 136. As discussed further below, the transition to a value within lower bound 134 and upper bound 136 might not be instantaneously achieved.

During second phase 126, the particular one current source is not properly regulating drive current (i.e., cannot source enough current to properly drive an LED) because drive current 138 during second phase 204 (see marker V2) is about 400 μA and power dissipation 140 is at a low value of about 1 μW. In general, this is because magnitude of supply voltage 110 is too low to properly power the particular one current source. However, as mentioned above, controller circuitry 118 of current source regulation circuitry 102 is configured to control the magnitude of supply voltage 110 in order to adjust the voltage drop across the particular one current source to a value within lower bound 134 and upper bound 136. In some scenarios, the transition to a value within lower bound 134 and upper bound 136 may not be instantaneously achieved.

For example, at onset of third phase 128 (about t=510 μs), an increase in magnitude of supply voltage 110 occurs to the extent that voltage drop 132 across the particular one current source has increased to about 1.2V (see marker V3), which is greater than the voltage value for upper bound 136 (about 1V). And, power dissipation 140 at this state of operation is at a high value of about 18 mW, which is not reasonable because across each one of 1000 current sources, for example, 18 mW power dissipation per current source may generate a substantial amount of heat or be considered overly wasteful in power supply terms. To mitigate this issue, monitor circuitry 112 of current source regulation circuitry 102 generates signal 114 at about t=520 μs as voltage drop 132 crosses upper bound 136. In response, controller circuitry 118 of current source regulation circuitry 102 generates signal 120 to adjust the magnitude of supply voltage 110 so that voltage drop 132 across the particular one current source is regulated back to a value within lower bound 134 and upper bound 136. While not instantaneous, only about 40 μs passes before steady state is achieved, at the end of third phase 128 (about t=660 μs), with voltage drop 132 at about 500 mV (see marker V4) which is within lower bound 134 and upper bound 136. Other example response times and parameter values may be gleaned from dataset 122 of FIG. 2.

At the end of third phase 128, the particular one current source of current source circuitry 106 is properly regulating drive current without excess or undesired power dissipation because drive current 138 at the end of third phase 128 (see marker V4) is about 15 mA (as expected) and power dissipation 140 is at a reasonable value of about 7.5 mW, which across each one of 1000 current sources, for example, may not generate a substantial amount of heat or be considered overly wasteful in power supply terms. Although the present disclosure is not so limited, several example implementations of current source regulation circuitry 102 are discussed in further detail below.

Light sources, e.g., semiconductor light sources, LEDs, may be arranged together as an array. The array of light sources may be arranged on top of a semiconductor device (array) that is arranged as a control circuit for the light sources. The light sources may be mounted onto the semiconductor device. In case the semiconductor device provides a current source for each light source, such current source may have to be driven individually to allow controlling the respective light source.

Figure 3:
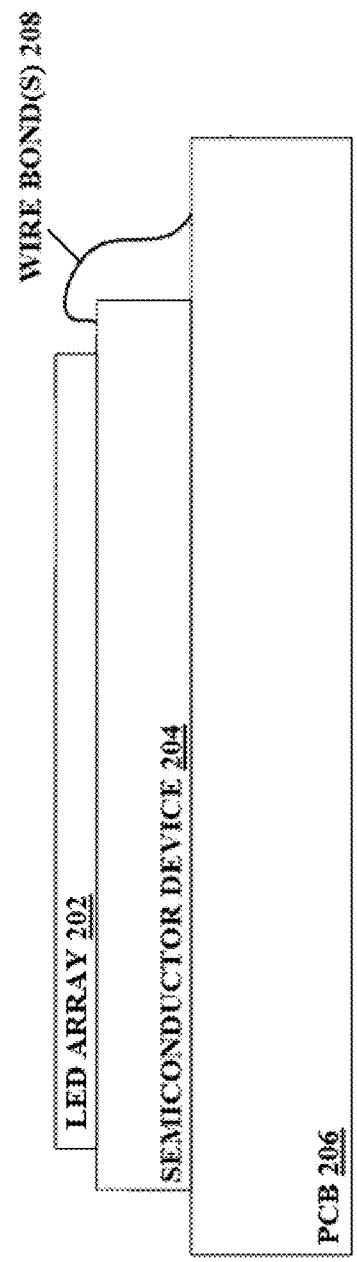
FIG. 3 shows an exemplary arrangement comprising an LED array which is placed on top of a semiconductor device.

FIG. 3 shows an exemplary arrangement comprising an LED array 202 which is placed on top of a semiconductor device 204 (e.g., chip-on-chip assembly). Semiconductor device 204 may be arranged on a printed circuit board (PCB) 206. Semiconductor device 204 may be electronically connected to PCB 206 via bond wires 208. Semiconductor device 204 may comprise at least one of the following: current sources for individual LEDs arranged on LED array 202, in particular at least one current source for each LED; a communication interface for driving the LEDs and for management purposes; generation of at least one reference current; and diagnosis and protection functionality. For such purpose, semiconductor device 204 may comprise an array of silicon cells, wherein each silicon cell (also referred to as pixel cell) may comprise a current source, which may be directly connected to an LED of LED array 202. In addition, semiconductor device 204 may comprise current source regulation circuitry or any other circuitry as discussed throughout.

Figure 4:
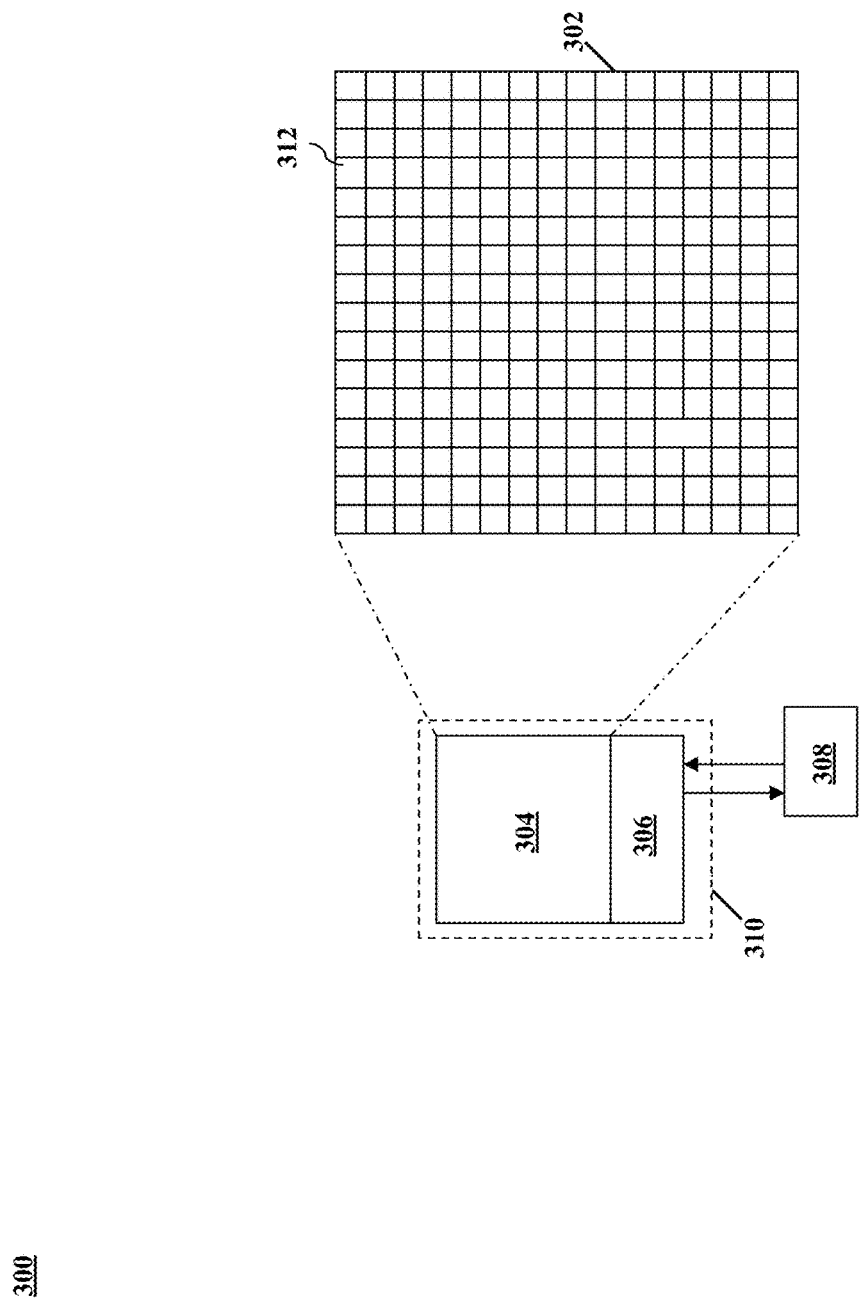
FIG. 4 shows an exemplary block diagram of a matrix of LEDs and a semiconductor device comprising an LED driver matrix and additional circuitry.

FIG. 4 shows an exemplary diagram comprising a matrix 302 of LEDs 312 (each pixel of the matrix may be represented by at least one LED) and a semiconductor device 310, which comprises an LED driver matrix 304 (e.g., a portion of the semiconductor device that is associated with each one pixel of the LED array 202) and circuitry 306. Semiconductor device 310 may be connected to a serial interface

308. Respective LEDs 312 of matrix 302 may be controlled via serial interface 308. Matrix 302 may be arranged on top of LED driver matrix 304. LED driver matrix 304 may be part of the semiconductor device 204 as shown in FIG. 1 and may comprise a pixel cell area (also referred to as "pixel cell") for each LED 312 of matrix 302. It is an option that LED driver matrix 304 has (e.g., substantially) the same area size as matrix 302. In particular, the pixel cell area of LED driver matrix 304 may have the same surface area as an individual one LED 312. LEDs 312 of matrix 302 may be directly connected to the pixel cells of LED driver matrix 304. Matrix 302 may in particular be arranged on top of LED driver matrix 304.

Circuitry 306 may comprise a serial interface for accessing LEDs 312 of matrix 302, e.g., one register for configuration purposes, a reference current generator, a reference voltage generator and a temperature sensor, and may be arranged in an area adjacent or distant to LED driver matrix 304. Matrix 302 may comprise an arbitrary number of LEDs (e.g., pixels) arranged in columns and rows. For example, matrix 302 may comprise 256 LEDs, 2044 LEDs, etc. In the example shown in FIG. 4, matrix 302 comprises 16 rows and 16 columns of LEDs 312, amounting to 256 LEDs.

It is noted that LED is mentioned as an example for a light source. It may be an option to use any kind of light source, in particular semiconductor light source. It is another option that each light source may be a component comprising at least two semiconductor light sources.

In an exemplary application, each pixel of LED array 202 may occupy a surface area of, for example, less than 150 μm*150 μm although surface area occupation may be implementation-specific. Any area suitable for a predetermined resolution of LED array 202 may be selected. The semiconductor light source may be arranged in the middle of each pixel cell. Adjacent pixel cells may have a gap between light sources amounting to less than 150 μm. Each LED may have one contact connected to LED driver matrix 304 and one contact connected to a common contact, e.g., GND. This is an exemplary scenario; other dimensions, distances and connections may apply accordingly.

With each LED being mounted directly on top of the semiconductor device, each current source is placed in an area defined by the surface area of the pixel cell. In the example provided above, the area amounts to 150 μm·150 μm=0.022500 mm². For increasing the resolution in x- and y-dimensions (e.g., 0.5°) of the light at long distance and for avoiding extra mechanical components for beam leveling adjustment, a short pitch between the pixel cells is beneficial. In the example provided above, the pitch between pixel cells may be less than 150 μm.

Due to the compact arrangement, a high amount of heat sources may generate different temperatures, which may influence temperature gradients and hence lead to a mismatch between pixels. In addition, the output of each current source per pixel cell may not be directly accessible as the LED driver matrix is directly connected to the LEDs. Hence, a solution is required that provides at least one of the following: a current source that provides current to the individual LED, which allows switching the LED on or off with high accuracy, optionally providing over-current protection; a diagnostic functionality capable of detecting an open-load and a short to ground of the output channel; a low mismatch between different pixels, i.e., between different current sources; current source regulation circuitry as discussed throughout; etc.

Figure 5:
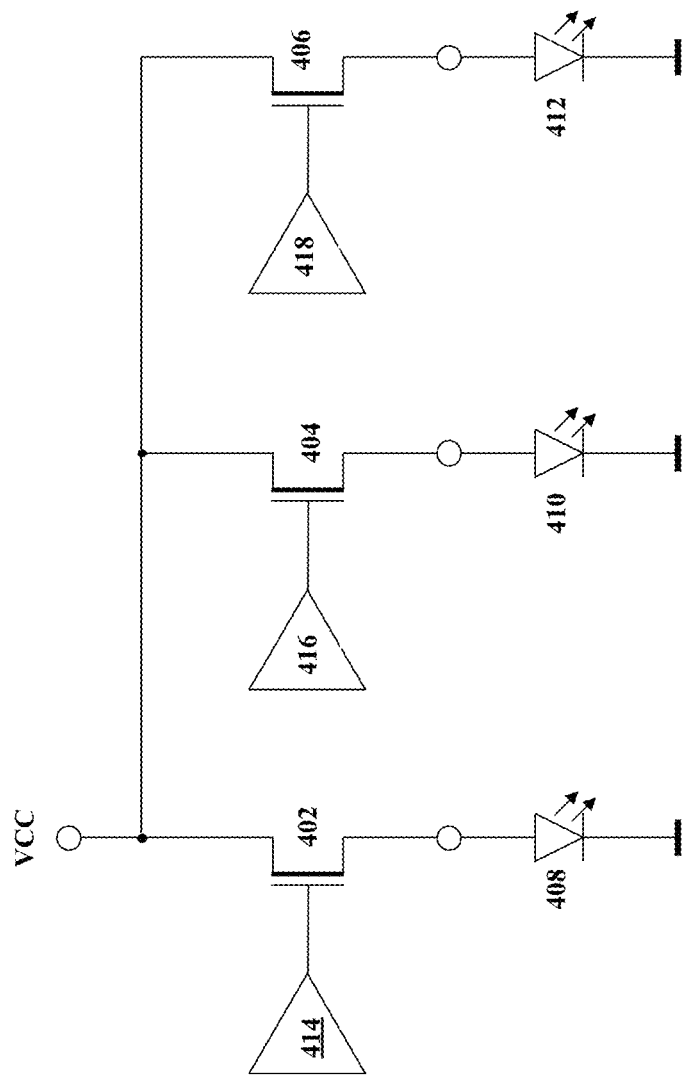
FIG. 5 shows exemplary high-side current sources, each of which being arranged on the LED driver matrix of FIG. 4, on top of which LEDs are mounted.

FIG. 5 shows high-side current sources 402, 404 406, each of which being arranged on LED driver matrix 304 on top of which LEDs 408, 410, 412 are mounted. In this scenario, LED 408 is arranged on top of current source 402, LED 410 is arranged on top of current source 404 and LED 412 is arranged on top of current source 406.

Each current source 402, 404, 406 may be an NMOS power stage with the drain connected to supply voltage Vcc, and with the source connected with the respective LED 408, 410 412. The gate of each NMOS power stage may be controlled via a corresponding error amplifier 414, 416, 418, and each error amplifier 414, 416, 418 may be used to control the output current using an internal reference current. Each error amplifier 414, 416, 418 may be enabled by a digital or by an analog signal.

In light of the foregoing, LED driver matrix 304 may thus comprise a relatively large number of current sources and/or switches on the area available for a pixel cell (in case the LED driver matrix is physically below the LED array). Examples presented herein in particular show how an efficient solution for the LED array and the underlying LED driver matrix may be realized even if the LED driver matrix is arranged on a silicon semiconductor device (e.g., single chip). Examples provided in particular cope with a high number of heat sources as well as heat gradients between current sources of the pixel cells.

Other examples show or provide current source regulation circuitry 102 that is arranged in a loop with power supply circuitry 104 and current source circuitry 106. In practice, supply voltage 110 generated by power supply circuitry 104 is used to power each current source of current source circuitry 106, and current source regulation circuitry 102 is configured to control the magnitude of supply voltage 110 in order to maintain the voltage drop across each current source of current source circuitry 106 to within a bounded range of voltage values. Advantageously, the bounded range of voltage values may be defined such that each one current source of current source circuitry 106 can properly regulate a drive current to drive an LED coupled thereto, and such that the amount of power dissipated by each current source of current source circuitry 106 during operation is maintained within an acceptable range.

Other examples presented herein allow providing an LED driver matrix comprising in particular at least one of the following: a communication interface for controlling the drivers for each pixel cell; an output current regulation with self-protection against over-current; an open-load and short to ground diagnostic functionality; and a low temperature sensitivity. This may in particular be achieved by distributing a control logic between a circuitry and the LED driver matrix, both integrated on a semiconductor device. The circuitry may be arranged adjacent to the LED driver matrix and the LED driver matrix may take the same surface area than the LED array, which can be arranged on top of the LED driver matrix as explained above. As an option, the circuitry may be arranged in an area adjacent or distant to the LED driver matrix.

A challenge is how to efficiently drive the current sources, wherein one current source is placed (or associated with) a pixel cell. As shown in the example described above, the distance between two pixel cells (e.g., less than 150 μm) may set forth limiting restrictions, which makes it difficult to electrically connect all current sources that are arranged below their associated light sources such that they can be driven by the circuitry of the semiconductor device.

Figure 6:
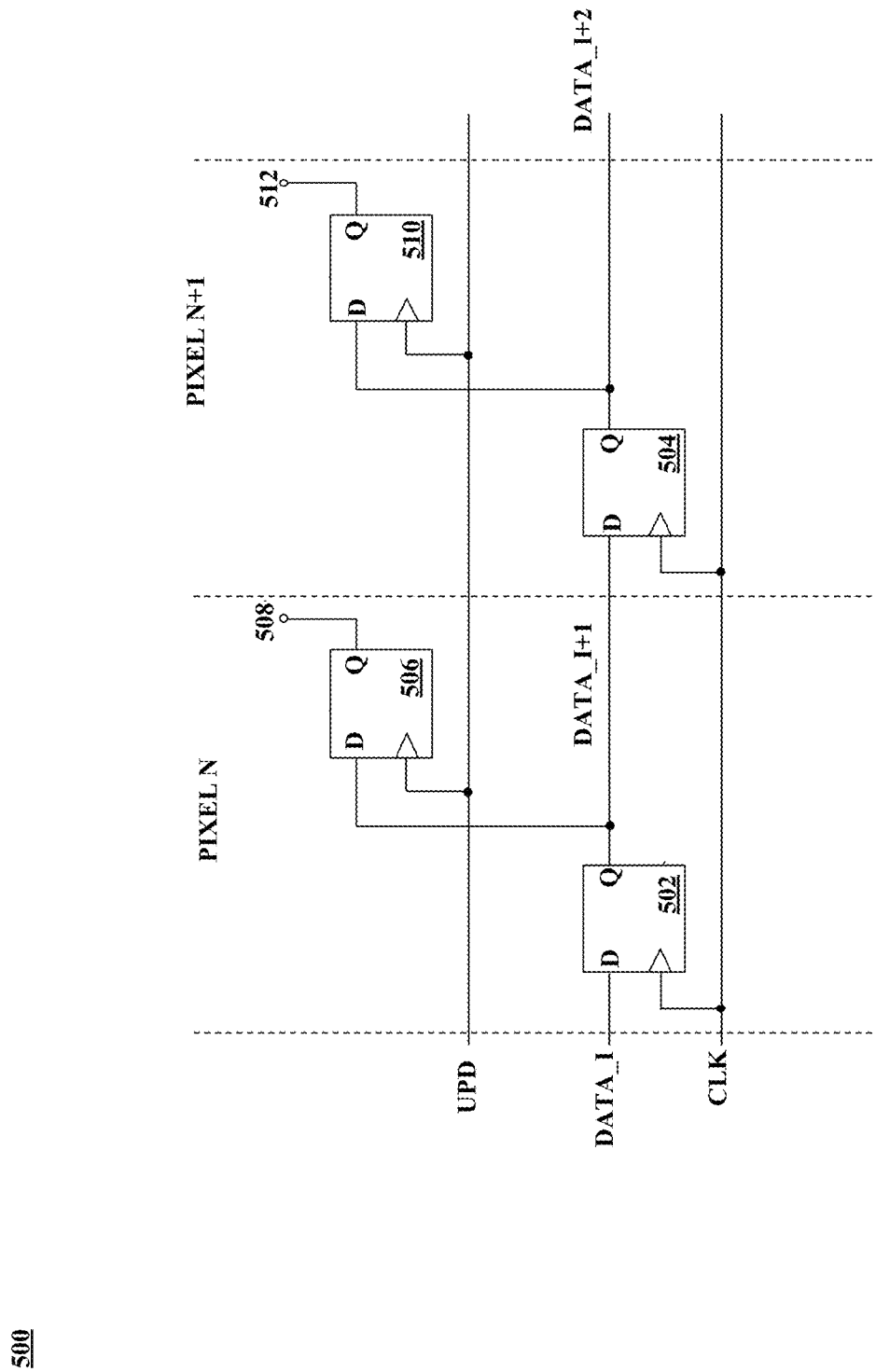
FIG. 6 shows exemplary pixel addressing circuitry that may be arranged on a semiconductor device for pixel cells n and n+1.

FIG. 6 shows an exemplary circuitry that may be arranged on a semiconductor device for two pixel cells n and n+1. In this example, circuitry 306 supplies an update signal UPD, a data signal Data_i and a clock signal CLK, pixel cell n provides a data signal Data_i+1 to the pixel cell n+1 and pixel cell n+1 provides a data signal Data_i+2 to a subsequent pixel cell (not shown).

In practice, data signal Data_i is a sequence of binary signals (e.g., "0" and "1") that are conveyed to a shift register. Each cell of the shift register may comprise a D-flip-flop, e.g., D-flip-flop 502 for pixel n and D-flip-flop 504 for pixel n+1. In this example, data signal Data_i is connected to the D-input of D-flip-flop 502, the Q-output of D-flip-flop 502 is connected to the D-input of D-flip-flop 504. Both D-flip-flops 502, 504 are driven by clock signal CLK. Hence, a sequence of "0" and "1" values may be conveyed to D-flip-flops 502, 504, wherein with each clock cycle (rising edge) of clock signal CLK, the actual value stored in D-flip-flop 502 is shifted to subsequent D-flip-flop 504 and the subsequent value provided by data signal Data_i is stored in D-flip-flop 502. According to the example shown, a bit sequence of first 0, then 1 is—after two clock cycles—stored in D-flip-flops 502, 504 such that D-flip-flop 502 has a value "1" and D-flip-flop 504 has the value "0".

A light source, e.g., LED, for pixel n is driven via a terminal 508 of a register, e.g., D-flip-flop 506. Similarly, a light source for pixel n+1 is driven via a terminal 512 of a register, e.g., D-flip-flop 510. The D-input of D-flip-flop 506 is connected to the Q-output of D-flip-flop 502 and the D-input of D-flip-flop 510 is connected to the Q-output of D-flip-flop 504. The enable (or clock) inputs of both D-flip-flops 506, 510 are connected to update signal UPD. When update signal UPD becomes "1" the value stored in D-flip-flop 502 becomes visible at the Q-output of D-flip-flop 506 and hence is used to drive the light source for this pixel n. Accordingly, the value stored in D-flip-flop 504 becomes visible at the Q-output of D-flip-flop 510 and hence is used to drive the light source of pixel n+1. Hence, the shift register exemplarily shown in FIG. 6 comprises two cells, wherein the cell for pixel n comprises D-flip-flop 502 and register 506 and the cell for pixel n+1 comprises D-flip-flop 504 and register 510.

FIG. 6 shows only an exemplary excerpt of a sequence of two pixel cells. This approach, however, may be applied to a sequence of more than two pixel cells, e.g., a column or a row of a matrix of pixels. In addition, several rows or columns may be connected and represented by an even longer shift register. Insofar, the shift register may be used for providing a data signal to all pixels of a column or line or even matrix and to update the column, line or matrix at once.

The frequency of clock signal CLK may advantageously be high enough to fill the shift registers for such sequence of pixels before the update signal UPD is activated and before the values stored at that time in the respective shift register are used to control the pixels of this sequence, e.g., column or row of the matrix of pixels. Hence, a high refresh rate for each pixel may result in a high resolution of a PWM dimming. Therefore, a high clock frequency may be advantageous to store the information in the flip-flop of the shift-register before triggering the update signal.

Advantageously, by providing registers (e.g., D-flip-flops according to FIG. 6) in daisy-chain fashion (one pixel driving the next one) and arranging those registers together with the respective pixel cells, a single line suffices to convey data signal Data_i to a sequence of pixels, whereas otherwise each pixel would require a separate connection to convey the data signal for controlling this pixel. It is noted that any sort of register or memory may be used to achieve the result described above. The register may be a flip-flop, a latch, register or any other element with a memorizing functionality.

Figure 7:
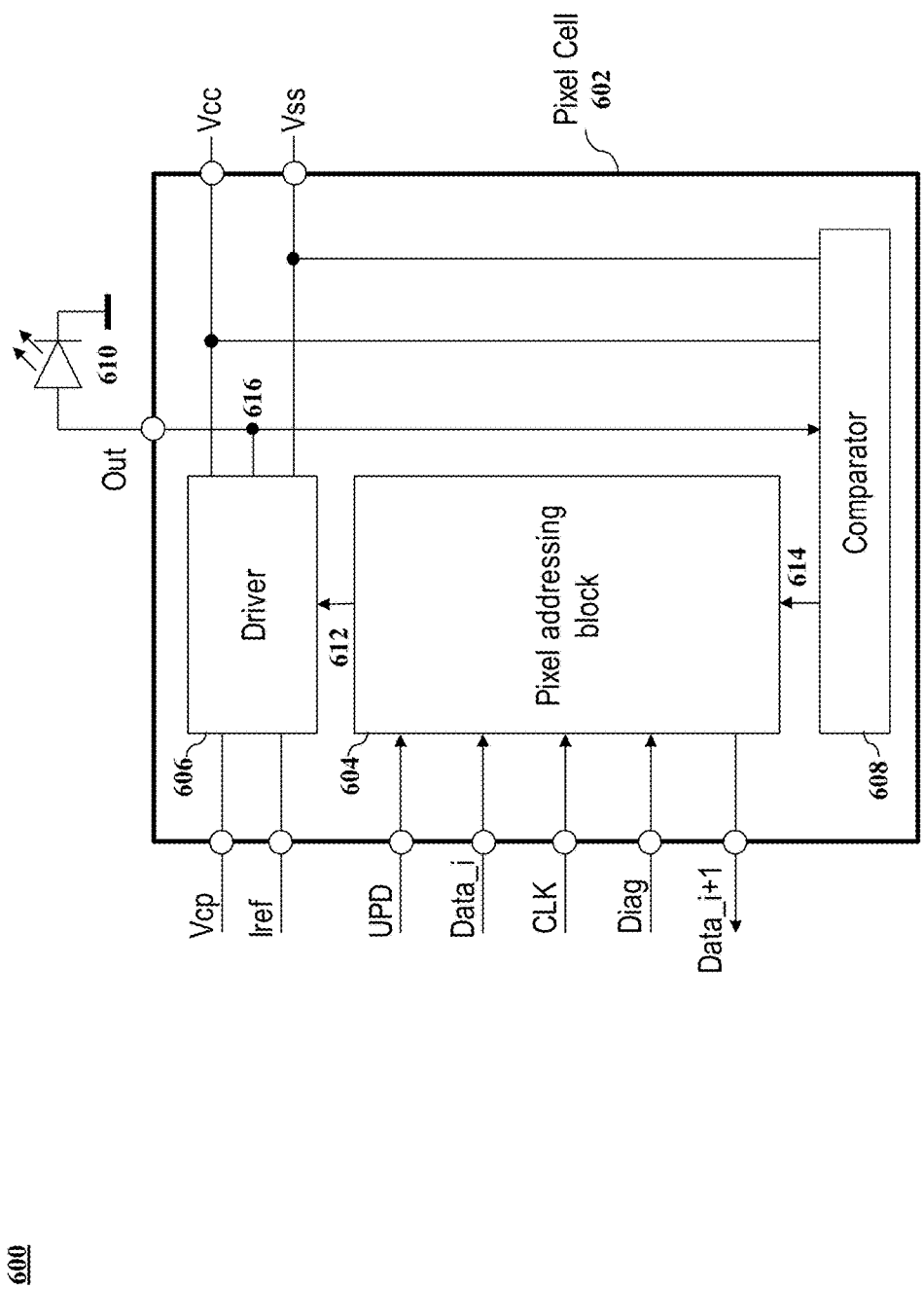
FIG. 7 shows an exemplary schematic block diagram of a pixel cell comprising a pixel addressing block, a driver and a comparator.

FIG. 7 shows a schematic block diagram of a pixel cell 602 comprising a pixel addressing block 604, a driver 606 and a comparator 608. As discussed in further detail below, current source regulation circuitry may be included within comparator 608 for diagnostic purposes. In other examples, current source regulation circuitry may be positioned outside of comparator 608 for diagnostic purposes.

Pixel cell 602 may correspond to a portion of semiconductor device 204 having the surface area of a pixel of LED array 202 as shown in FIG. 3 (and FIG. 4). Pixel cell 602 may include a terminal Out that can be connected to a light source, e.g., an LED 610 of an LED array (202). The light source may be directly mounted onto the semiconductor device, e.g., positioned above pixel cell 602. Hence, the LED mounted on the semiconductor device can be regarded as an integral part of the pixel cell. As an option, the term "pixel cell" may refer to the piece of the semiconductor device that is associated with a single LED, which may be mounted onto this piece of the semiconductor device. It is noted that pixel cell 602 may be part of semiconductor device 204, in particular LED driver matrix 304. In one example, pixel cell 602 may correspond to LED driver matrix 304 according to FIG. 4.

Driver 606 is supplied by a voltage Vcp and a voltage Vcc. Also, a reference current Iref is conveyed to driver 606. The reference current Iref may be supplied by circuitry 306, e.g., via a current source arranged with circuitry 306. Driver 606 is connected to ground (Vss). In addition, driver 606 receives a signal 612 from pixel addressing block 604 and supplies an output signal to drive light source 610 via a node 616. Node 616 is connected to the terminal Out.

Pixel addressing block 604 obtains the update signal UPD, the data signal Data_i and the clock signal CLK. It provides the data signal Data_i+1 for a subsequent pixel cell (or for circuitry 306 if there is no subsequent pixel cell). Further, pixel addressing block 604 supplies signal 612 to driver 606. The basic functionality of the pixel addressing block 604 is explained with regard to FIG. 6 and FIG. 8.

If pixel cell 602 is equipped with a diagnosis functionality, a diagnosis signal Diag may be provided to pixel addressing block 604 of pixel cell 602. In such scenario, the node 616 is also connected to comparator 608, and a result processed by comparator 608, and conveyed as a signal 614 to pixel addressing block 604. Comparator 608 is also connected to Vcc and Vss. As an option, all connections to/from pixel cell 602 may be with circuitry 306, except for the terminal Out, which is connected to LED 610 that may be mounted on top of pixel cell 602.

Figure 8:
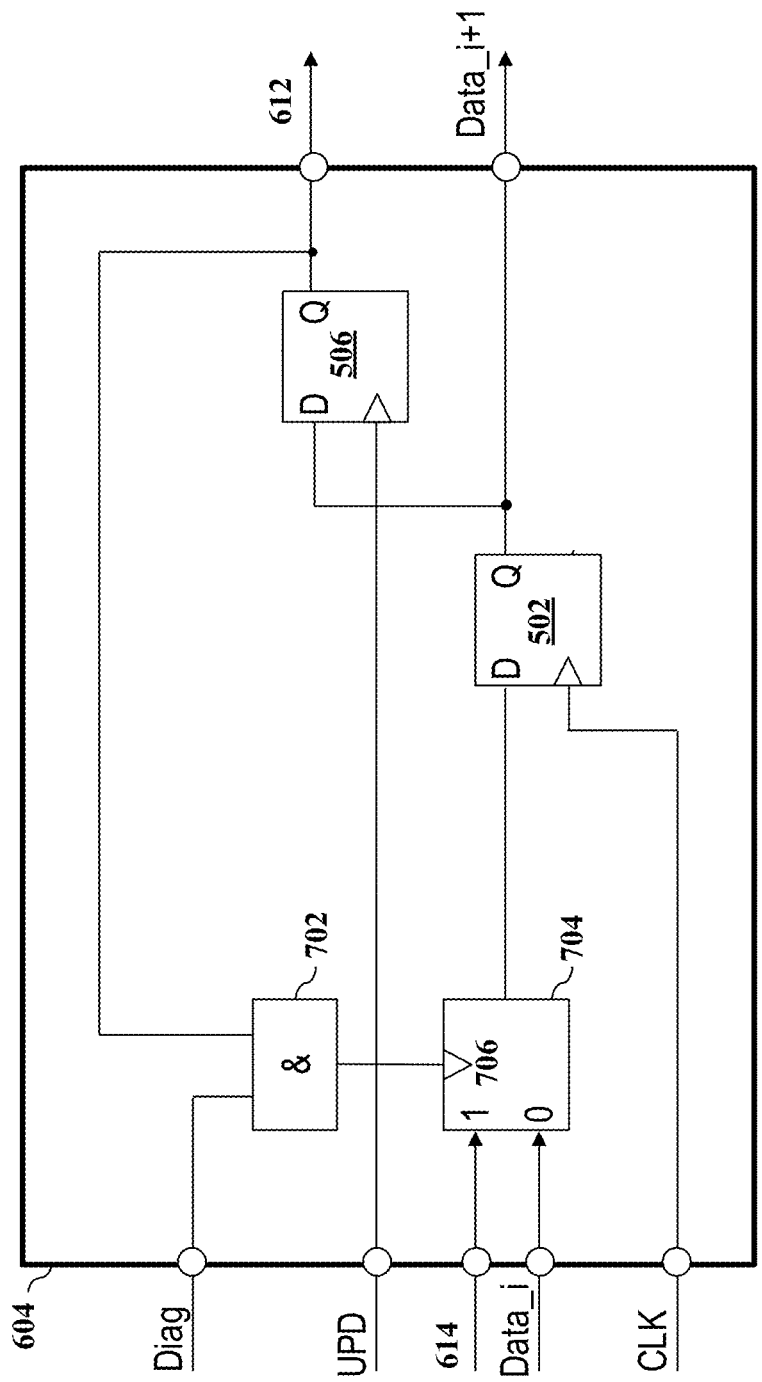
FIG. 8 shows an exemplary implementation of the pixel addressing block of FIG. 7.

FIG. 8 shows an exemplary implementation of pixel addressing block 604. Reference is also made to the discussion provided in connection with FIG. 6 above. In addition to FIG. 6, pixel addressing block 604 comprises a diagnosis functionality. The signal 614 from comparator 608 is conveyed to an entry "1" of a multiplexer 704, whereas the signal Data_i is conveyed to an entry "0" of multiplexer 704. Either entry "0" or "1" of multiplexer 704 are selected via an input 706 of multiplexer 704. The output of multiplexer 704 is connected to the D-input of D-flip-flop 502. Depending on a digital value supplied to input 706, one of the inputs of multiplexer 704 is connected to the D-input of D-flip-flop 502. specifically, if the value supplied to input 706 is "0", the signal Data_i is conveyed to the D-input of D-flip-flop 502, if the value is "1", signal 614 is conveyed to the D-input of D-flip-flop 502.

The diagnosis signal Diag is conveyed to a first input of an AND-gate 702 and the second input of AND-gate 702 is connected to the Q-output of D-flip-flop 506. The output of AND-gate 702 is connected with input 706 of multiplexer 704. According to this example, if the signal Diag is "1" and the Q-output of D-flip-flop 506 is "1", signal 614 is selected by multiplexer 706 to be connected to the D-input of D-flip-flop 502. Otherwise, in event at least one of the inputs of AND-gate 702 is "0", signal Data_i is selected by multiplexer 706 to be connected to the D-input of D-flip-flop 502. The Q-output of D-flip-flop 506 conveys signal 612 to driver 606 (see FIG. 6). The Q-output of D-flip-flop 502 provides the subsequent data signal Data_i+1.

Figure 9:
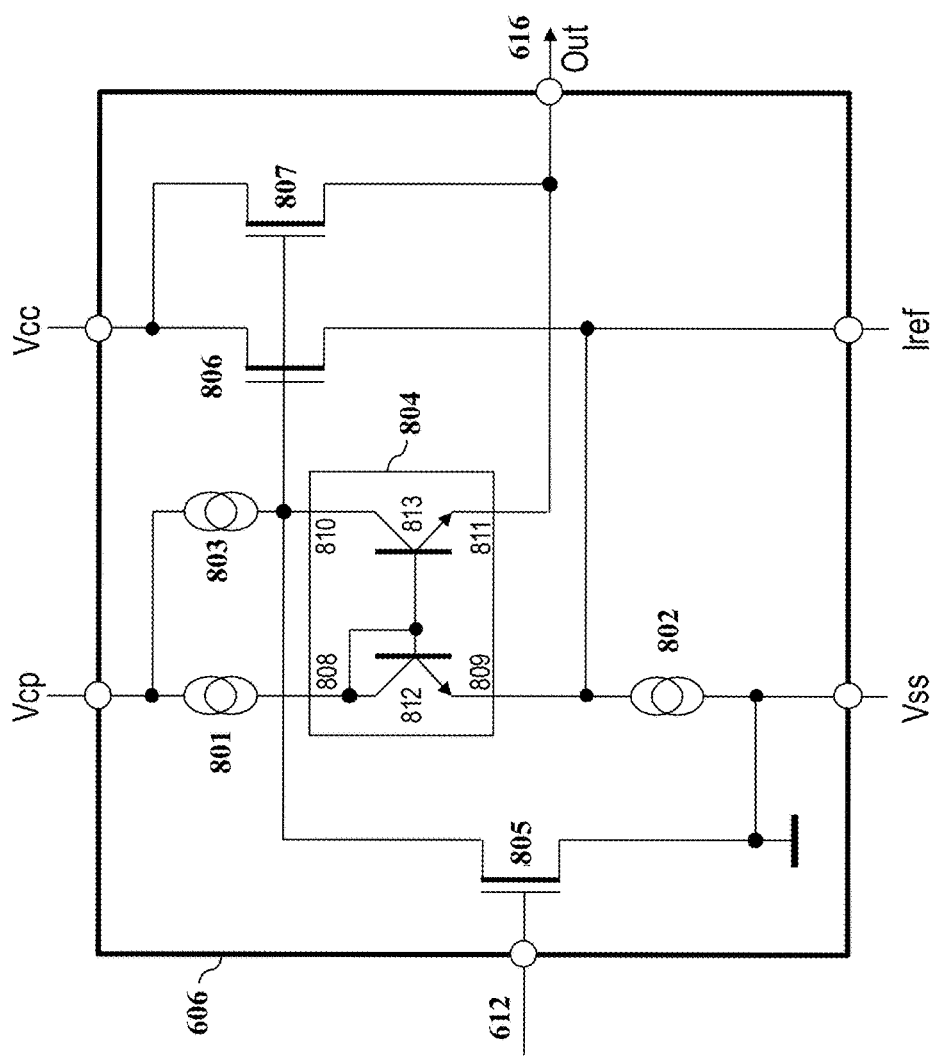
FIG. 9 shows an exemplary implementation of the driver of FIG. 7.

FIG. 9 shows an exemplary implementation of driver 606. Signal 612 from pixel addressing block 604 is conveyed to the gate node of an n-channel MOSFET 805. The drain of MOSFET 805 is connected to the gate of an n-channel MOSFET 806 and to the gate of an n-channel MOSFET 807. MOSFET 806 corresponds to a sense stage and MOSFET 807 corresponds to a power stage of driver 606.

The source of MOSFET 805 is connected to Vss. Vcp is conveyed via a current source 801 to a terminal 808 of a current mirror 804. Also, Vcp is connected via a current source 803 to a terminal 810 of current mirror 804. Terminal 810 is connected to the gate of MOSFET 806. A terminal 809 of current mirror 804 is connected via a current source 802 to Vss. A terminal 811 of current mirror 804 is connected to node 616, which is also connected to the terminal Out. The current sources 801 and 803 each reflect a bias current.

Current mirror 804 comprises two npn-transistors 812 and 813. The collector of transistor 812 is connected to terminal 808 and to the base of transistor 812, as well as to the base of transistor 813. The emitter of transistor 812 is connected to terminal 809. The collector of transistor 813 is connected to terminal 810 and the emitter of transistor 813 is connected to terminal 811. Vcc is connected to the drain of MOSFET 806 and to the drain of MOSFET 807. Reference current Iref is conveyed to the source of MOSFET 806 and to terminal 809 of current mirror 804. The source of MOSFET 807 is connected to node 616.

MOSFET 807 acts as an NMOS power stage and MOSFET 806 acts as an NMOS sense cell. The gate-source voltage of MOSFET 807 is regulated via current mirror 804 based on the reference current Iref and a predetermined KILIS-factor (amounting, e.g., to 50).

The KILIS-factor refers to a ratio between a load current and a sense current. The load current is KILIS-times higher than the sense current. The topology of driver 606 may be beneficial for reducing power dissipation of a corresponding cell by providing a low voltage drop across the power stage at a high current.

Reference current Iref may be provided by circuitry 306 for all pixel cells. Hence, reference current Iref may be generated remote to the heat sources of the pixel cells. The current may be mirrored per pixel cell, per row of pixel cells and/or per column of pixel cells. Thus, generating the reference current Iref for current mirror 804 outside driver 606 bears in particular the advantage that the area required on the semiconductor device required for the pixel cell can be further reduced. It is another advantage that the reference current Iref is substantially identical for all the pixel cells. Hence, any influence of the power dissipation of the pixel cells has a limited impact on adjacent pixel cells resulting in a high accuracy of the output current per pixel cell.

It is an option that the power stage is designed with a KILIS-factor amounting to 4:200, i.e. the NMOS sense stage comprises 4 cells with each of these cells being mirrored with 50 cells of the power stage. These 4 cells may be arranged in the layout in a cross-coupled configuration to reduce the impact of different temperature gradients.

Driver 606 shown in FIG. 9 also provides high precision with low offset, occupies only a small area on the chip and allows for protection against over-current in case of a short-circuit to Vss. Hence, when a short-circuit appears at the terminal Out, current mirror 804 that provides the reference current is not able to work, and MOSFET 807 (power stage) is pulled down.

Figure 10:
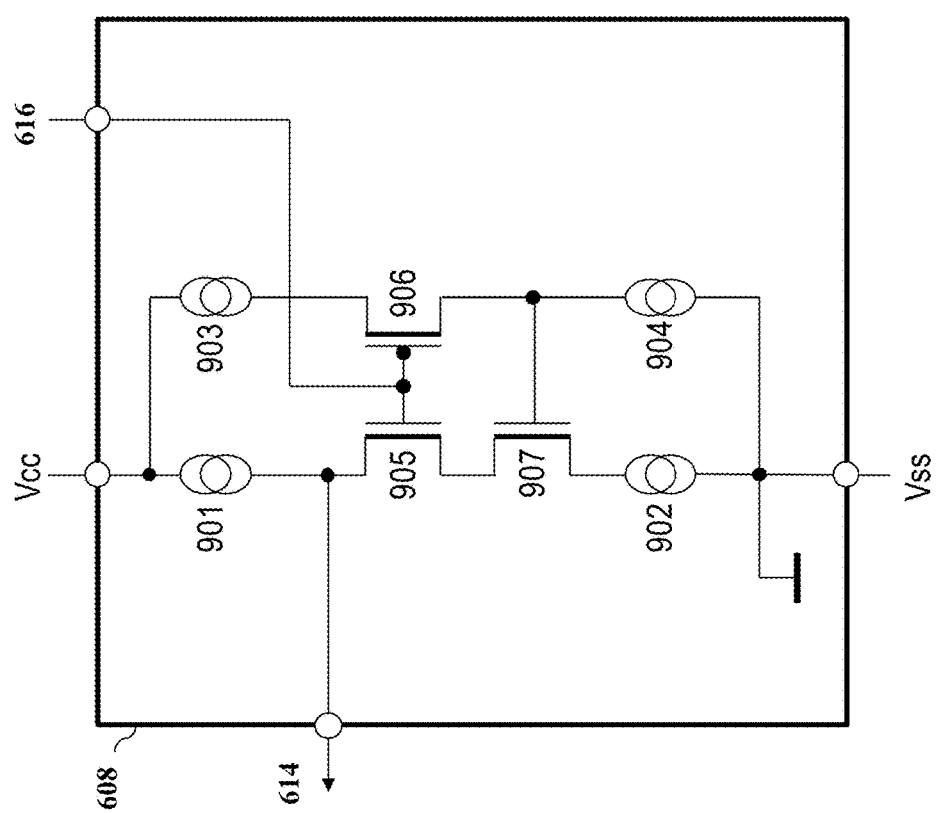
FIG. 10 shows an exemplary implementation of the comparator of FIG. 7.

FIG. 10 shows an exemplary implementation of comparator 608. Comparator 608 also provides an EXCLUSIVE-OR functionality. In the example of FIG. 10, node 616 is connected to the gate of an n-channel MOSFET 905 and to the gate of a p-channel MOSFET 906 (both gates are tied together). Signal 614 is supplied via the drain of MOSFET 905. The drain of MOSFET 905 is connected via a current source 901 to Vcc. The drain of MOSFET 906 is connected via a current source 903 to Vcc. The source of MOSFET 905 is connected to the drain of an n-channel MOSFET 907. The source of MOSFET 907 is connected via a current source 902 to Vss. The source of MOSFET 906 is connected to the gate of MOSFET 907. Also, the source of MOSFET 906 is connected via a current source 904 to ground Vss. The current sources 901 to 904 each reflect bias currents.

The diagnosis functionality shown in pixel addressing block 604 according to FIG. 8 in combination with the comparator of FIG. 10 allows for each pixel cell to determine whether there is an open-load or a short-circuit to ground situation.

Comparator 608 may be arranged as a window comparator capable of detecting both conditions, i.e. open-load as well as short-circuit. Advantageously, comparator 608 only requires a small area on chip. Pixel addressing block 604 is arranged to select via multiplexer 704 output 614 of comparator 608 instead of the data signal Data_i. Hence, the status of output 614 (indicating whether the pixel cell works within predefined parameters or shows an open-load or a short-circuit condition) is loaded into the shift register and may be read from the shift register (after a predetermined number of clock cycles).

For example, a data frame of 256 bits with only the pixel which has to be checked is fed into the shift register and the diagnosis signal Diag is enabled (i.e. set to "1") for this pixel cell to be checked. Multiplexer 704 of the pixel cell does not convey the data signal Data_i of the previous pixel cell, but output 614 of comparator 608. Another data frame of 256 bits is supplied to convey the diagnosis information from shift register 502 to circuitry 306 and to a microcontroller that may process this diagnosis information. Hence, it may be determined whether the pixel cell to be diagnosed works within predefined parameters (indicated by logic "0") or suffers from open-load or a short-circuit to ground issues (indicated by logic "1"). This routine may be repeated 256 times to check all the pixel cells of matrix 302.

Comparator 608 provides a "high" digital logic information in case the output voltage is too high (open load) or too low (short-circuit to ground). The reference voltages used are the threshold voltage of MOSFET 905 and of MOSFET 906.

As soon as the voltage at node 616 (which corresponds to the voltage across the LED 610 is lower than a predetermined threshold, MOSFET 905 is switched off and the current provided by current source 901 pulls up signal 614, results in a logic "1" to be stored in D-flip-flop 502. As soon as the voltage at node 616 is greater than a voltage Vcc-Vth (Vth being the threshold voltage, in this example of MOSFET), MOSFET 906 is switched off and the current provided by current source 904 pulls down the gate of MOSFET 907 (thereby being switched off) and therefore the current of current source 901 pulls up signal 614, resulting in a logic "1" to be stored in D-flip-flop 502.

In normal operation (i.e. the voltage at node 616 being not zero or too high), MOSFET 905 is switched on and MOSFET 906 is switched on, which results in MOSFET 907 being switched on. The current provided by current source 902 is higher than the current provided by current source 901 to pull down the signal 614 to logic "0". Also, the current by current source 903 is higher than the current provided by the source 904 so that MOSFET 907 is on and to allow the left branch to enable (pulling down the signal 614). Hence the signal logic "0" is stored in D-flip-flop 502.

Hence, with only a few MOSFETs comparator 608 is able to generate signal 614 amounting to logic "1" in case the voltage at node 616 is lower than the predetermined threshold (which allows detecting of a short-circuit to ground) or in case the voltage at node 616 is higher than the voltage Vcc-Vth (which allows detecting of an open load condition). Hence, each pixel of the matrix of LEDs (see FIG. 2) can be checked in a fast and efficient manner. A discussion similar that provided above may be found in U.S. patent application Ser. No. 14/718,956, filed 21 May 2015, entitled DRIVING SEVERAL LIGHT SOURCES, and U.S. patent application Ser. No. 14/719,035, filed 21 May 2015, entitled DRIVING SEVERAL LIGHT SOURCES, the entirety of each one of which is hereby incorporated by reference.

As discussed above, current source regulation circuitry 102 is arranged in a loop with power supply circuitry 104 and current source circuitry 106. In practice, supply voltage 110 generated by power supply circuitry 104 is used to power each current source of current source circuitry 106, and current source regulation circuitry 102 is configured to control the magnitude of supply voltage 110 in order to maintain the voltage drop across each current source of current source circuitry 106 to within a bounded range of voltage values. Advantageously, the bounded range of voltage values may be defined such that each one current source of current source circuitry 106 can properly regulate a drive current to drive an LED coupled thereto, and such that the amount of power dissipated by each current source of current source circuitry 106 during operation is maintained within an acceptable range.

As such, current source regulation circuitry 102 may be considered to implement a diagnosis or diagnostic function, wherein for each pixel in a pixel array, for example, current source regulation circuitry 102 may: a) measure the voltage drop across each current source (current driver) to determine whether the voltage drop is kept above a minimum value (i.e., lower bound 134 as show in FIG. 2), sometimes referred to as "UnderRun"; b) measure the voltage drop across each current source (current driver) to determine whether the voltage drop is kept below a maximum value (i.e., upper bound 136 as shown in FIG. 2), sometimes referred to as "OverRun"; c) check in each pixel whether the current driver is in ON or OFF state, to avoid incorrect information for a) and b).

Figure 11:
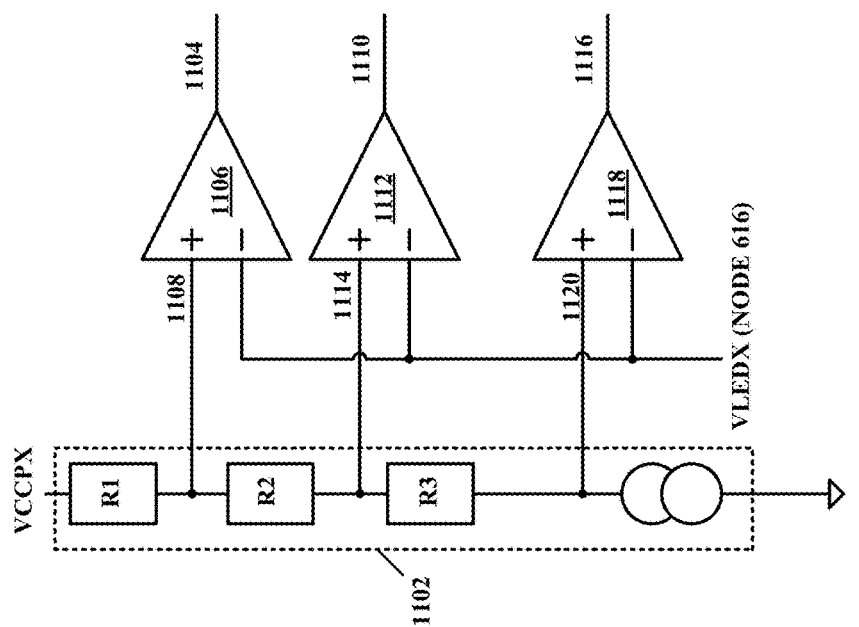
FIG. 11 shows an exemplary implementation of the current source regulation circuitry of FIG. 1.

In general, such an implementation may be referred to as a smart or intelligent diagnosis or diagnostic whereby, in some examples, current source regulation circuitry 102 is able to detect low or high voltage drop and provide via serial communication interface a bit streaming in which each bit is the information about status of each single pixel. Each bit may be stored in an array, and then each bit may be read from the array in order to determine the operational status (e.g., voltage drop across driver, ON/OFF status, etc.) of each current source for each pixel in the pixel array. The operational status of each current source for each pixel in the pixel array may, alone or together, influence current source regulation circuitry 102 to control the magnitude of supply voltage 110 in order to maintain the voltage drop across each one current source of current source circuitry 106 to within a bounded range of voltage values. FIG. 11 illustrates an example of such an implementation.

FIG. 11 shows an exemplary implementation 1100 of current source regulation circuitry 102 of FIG. 1. In general, current source regulation circuitry 102 may be incorporated within each and every pixel cell of a plurality of pixel cells, such as in each pixel cell of the pixel cell array (i.e., LED driver matrix 304) of FIG. 4. In particular, current source regulation circuitry 102 may be incorporated within comparator 608 of pixel cell 602 as shown in FIG. 7. In this example, implementation 1100 includes a resistive ladder network 1102 connected to VCC (VCCPX), whereby an output 1104 of a first comparator 1106 is high for example when the voltage drop across the driver 606 of FIG. 7, as defined between VCC and node 616, is greater than a magnitude of voltage at node 1108 (i.e., upper bound 136 which, in general, is contemplated as being a programmable value, and in the example implementation of FIG. 11 may be selectively or programmatically defined by choosing values for R1-R3).

Similarly, output 1110 of a second comparator 1112 is high for example when the voltage drop across the driver 606 of FIG. 7, as defined between VCC and node 616, is less than a magnitude of voltage at node 1114 (i.e., lower bound 134 which, in general, is contemplated as being a programmable value, and in the example implementation of FIG. 11 may be selectively or programmatically defined by choosing values for R1-R3). Additionally, output 1116 of a third comparator 1118 is high for example when the voltage drop across the driver 606 of FIG. 7, as defined between VCC and node 616, is less than the voltage value at node 1120 (which, in general, is contemplated as being a programmable value, and in the example implementation of FIG. 11 may be selectively or programmatically defined by choosing values for R1-R3). In this example, voltage at node 1120 represents a threshold value below which LED 610 as shown in FIG. 6 is considered to be in an OFF state. It is contemplated that when in an OFF state, as opposed to an ON state, information as obtained at output 1104 and at output 1110 in FIG. 11 may be discarded by current source regulation circuitry 102 of FIG. 1 such that the same information does not influence signal 120 (see FIG. 1).

For example, the two instances or pulses of signal 114 as shown along the bottom portion of FIG. 2 may in general correspond to information as obtained at output 1104 and at output 1110 in FIG. 11. In this example, if the voltage value at output 1116 indicates that LED 610 (i.e. the "particular one current source of current source circuitry 106" as discussed above in connection with FIG. 2) is in fact in an OFF state, then current source regulation circuitry 102 of FIG. 1 may discard information as obtained at output 1104 and at output 1110, such that the same information does not influence signal 120. Several advantages to exemplary implementation 1100 relate to quick information capture (i.e., respective voltage drop data for current driver in each pixel cell may be obtained in parallel) and read (e.g., serial comparison is made). Other implementations of current source regulation circuitry 102 of FIG. 1 are possible.

Figure 12:
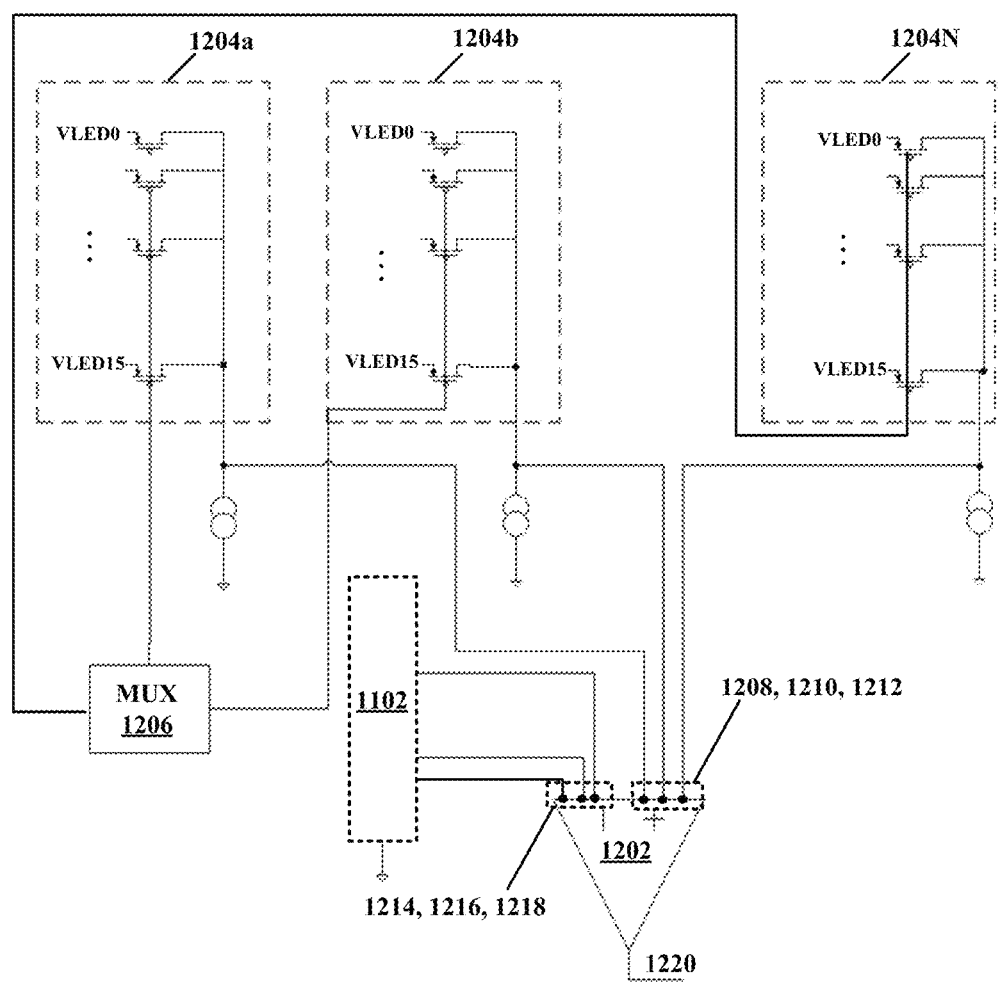
FIG. 12 shows another exemplary implementation of the current source regulation circuitry of FIG. 1.

FIG. 12 shows an exemplary implementation 1200 of current source regulation circuitry 102 of FIG. 1. In this example, a single comparator 1202 is positioned outside an LED driver matrix (e.g., outside LED driver matrix 304 of FIG. 4), illustrated as comprising LED strings 1204a-N in FIG. 12, where N is an arbitrary integer value. In this example, a multiplexer 1206 is leveraged to sense each pixel output voltage (VLEDx) sequentially, preferentially (i.e., by preferentially selecting or addressing a particular pixel) and/or by random polling using pass gates based on a multiplexer selection done by row/column. And, a pixel output voltage at any particular one of input nodes 1208, 1210, 1212 of comparator 1202 may be compared with reference voltages output by resistive ladder network 1102 (see also FIG. 11) at any particular one of input nodes 1214, 1216, 1218 of comparator 1202, to enable comparator 1202 to produce a high (or low) at output 1220. In general, a value at output 1220 may assume a value consistent with any one of output 1104, output 1110 and output 1116 as discussed above in connection with FIG. 11. As such, exemplary implementation 1200 as shown in FIG. 12 may in general function in a manner similar to exemplary implementation 1100 as shown in FIG. 11. However, some advantages realized by exemplary implementation 1200, but not exemplary implementation 1100, may include preferred pixel cell addressing or selection, and a reduction in the number of comparators used to implement the circuit. Other implementations of current source regulation circuitry 102 of FIG. 1 are possible.

Figure 13:
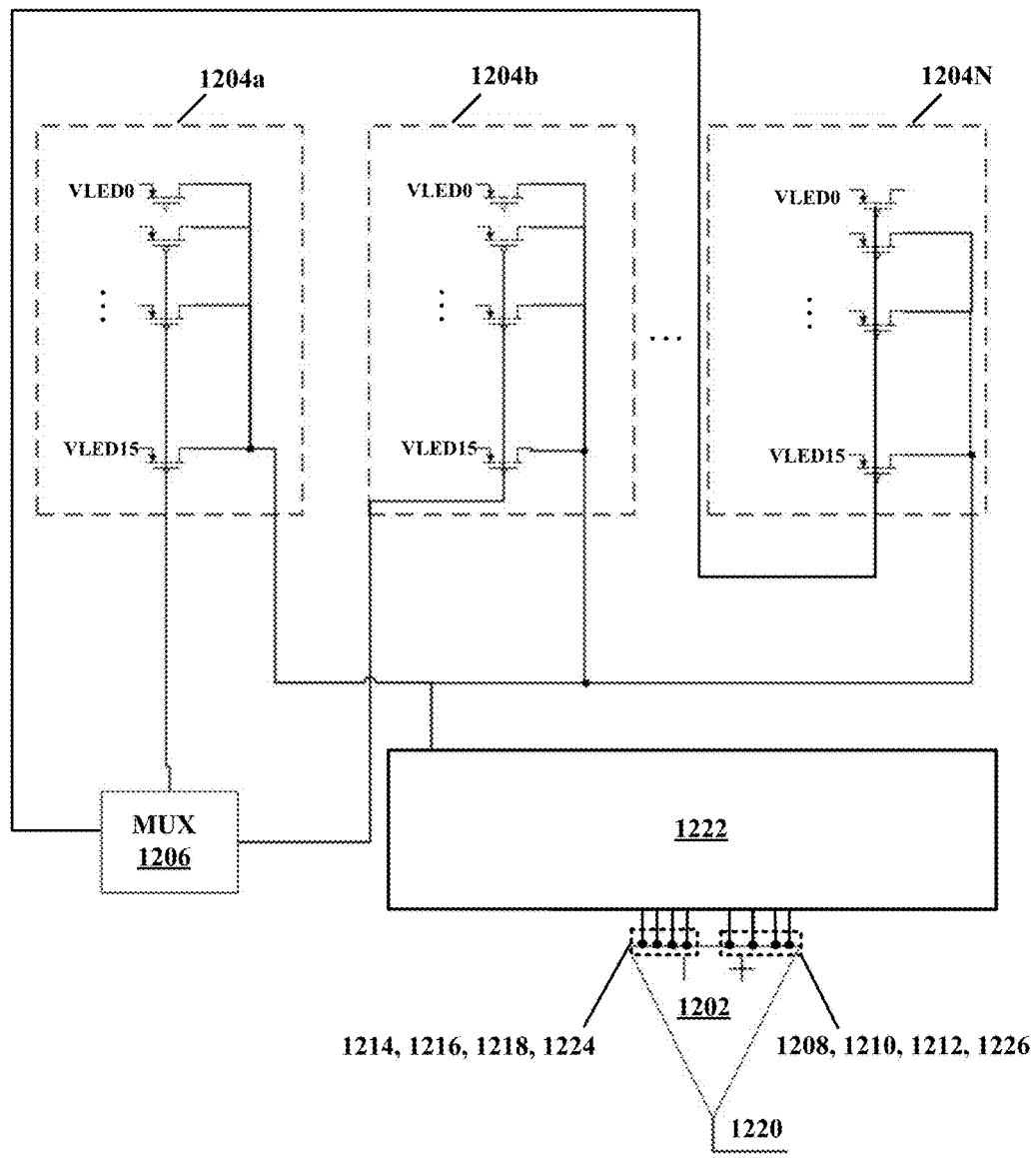
FIG. 13 shows another exemplary implementation of the current source regulation circuitry of FIG. 1.
Figure 14:
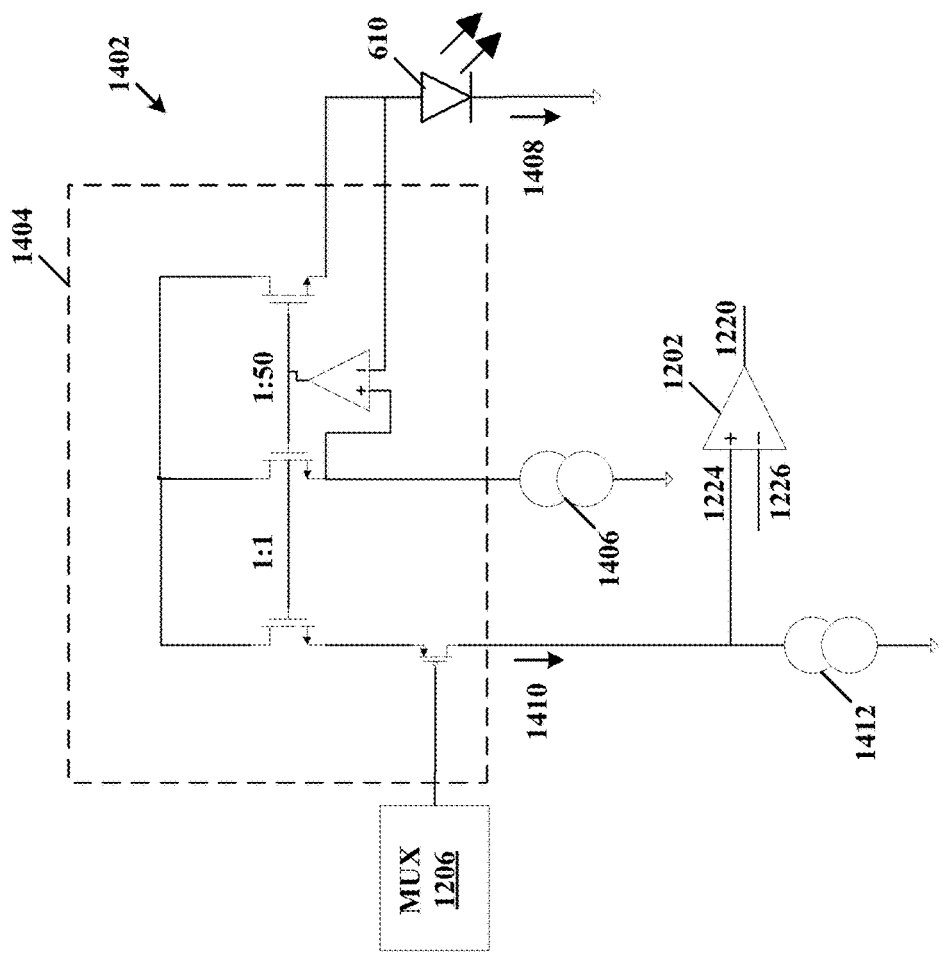
FIG. 14 shows modification circuitry of the implementation of FIG. 13 in detail.

FIG. 13 shows an exemplary implementation 1300 of current source regulation circuitry 102 of FIG. 1. In general, exemplary implementation 1300 is substantially similar to exemplary implementation 1200 of current source regulation circuitry 102 of FIG. 12, but exhibits modification circuitry 1222. FIG. 14 shows modification circuitry 1222 of exemplary implementation 1300 of FIG. 13 in detail. Additionally, comparator 1202 exhibits a change in number of input nodes. Specifically, comparator 1202 as depicted in FIG. 13 includes input nodes 1214, 1216, 1218 and an additional input node 1224, and input nodes 1208, 1210, 1212 and an additional input node 1226. In this example, a sense circuit 1402 (see FIG. 14) of modification circuitry 1222 includes a first circuit component 1404 and a second circuit component 1406. First circuit component 1404 and second circuit component 1406 of modification circuitry 1222 are included in each pixel cell 602 (see FIG. 6) to generate a reference current 1410 that reflects magnitude of LED current 1408. Reference current 1410 is selectively passed via control by MUX 1206 through a third circuit component 1412 to develop a voltage at node 1224 of comparator 1202. In practice, a high for example is provided at output 1220 of comparator 1202 when voltage at node 1224 is such as to reflect that LED current 1408 is outside of regulation. Such functionality is in addition to that as shown in FIG. 12. However, resistive ladder network 1102 is not depicted in FIG. 13 in order to simplify the illustration. Other implementations of current source regulation circuitry 102 of FIG. 1 are possible.

Figure 15:
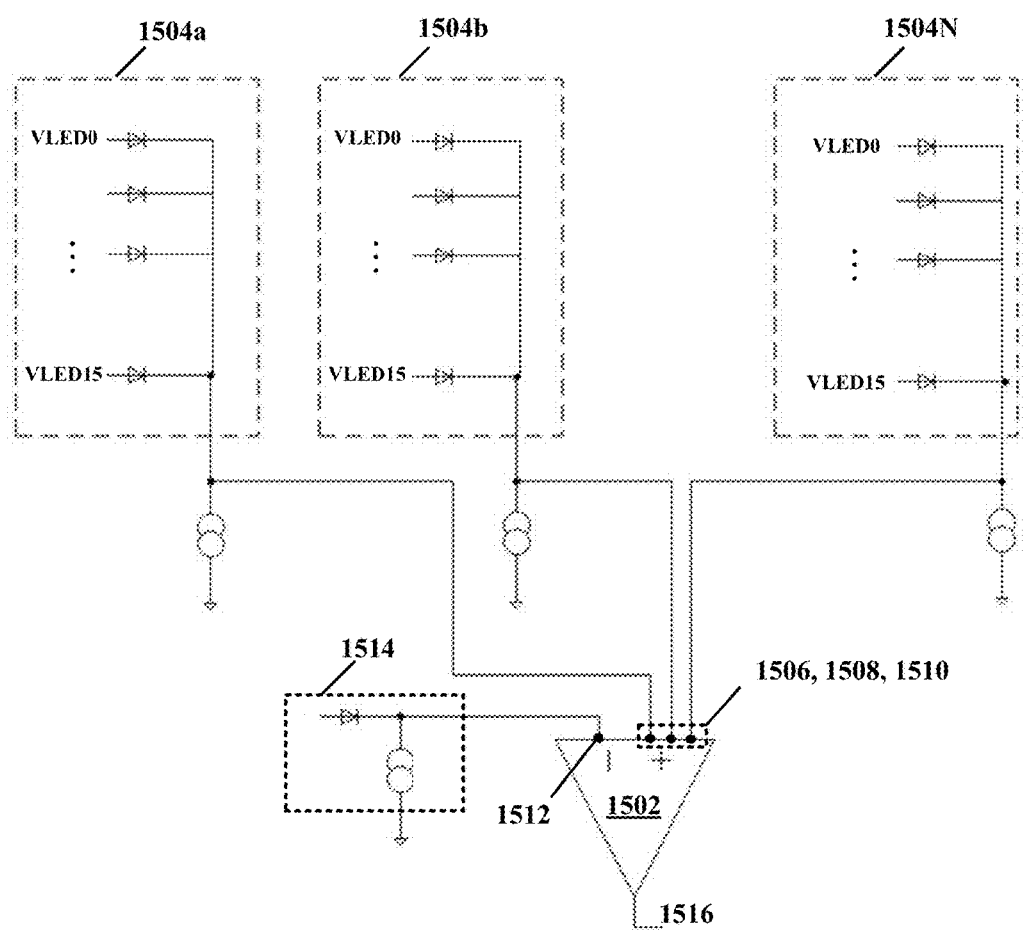
FIG. 15 shows another exemplary implementation of the current source regulation circuitry of FIG. 1.

FIG. 15 shows an exemplary implementation 1500 of current source regulation circuitry 102 of FIG. 1. In this example, a single comparator 1502 is positioned outside an LED driver matrix (e.g., outside LED driver matrix 304 of FIG. 4), illustrated as comprising LED strings 1504a-N in FIG. 15. In practice, comparator 1502 compares each pixel output voltage (VLEDx) realized at any particular one of input nodes 1506, 1508, 1510 of comparator 1502 with a fixed threshold voltage realized at input node 1512 of comparator 1502, which is provided by diode circuit 1514. Such an implementation is analogous to a maximum selector, and a signal at output node 1516 of comparator 1502 is indicative of status of the voltage drop across any particular current driver of the LED driver matrix. An advantage to exemplary implementation 1500 of current source regulation circuitry 102 relates to the ability to perform a parallel diagnosis.

Other implementations of current source regulation circuitry 102 of FIG. 1 are possible, and it is contemplated that each implementation of current source regulation circuitry 102 of FIG. 1, including those specific implementations contemplated by this disclosure may be considered to implement a diagnosis or diagnostic function, wherein for each pixel in a pixel array, for example, current source regulation circuitry 102 may: a) measure the voltage drop across each current source (current driver) to determine whether the voltage drop is kept above a minimum value (i.e., lower bound 134 as show in FIG. 2), sometimes referred to as "UnderRun"; b) measure the voltage drop across each current source (current driver) to determine whether the voltage drop is kept below a maximum value (i.e., upper bound 136 as shown in FIG. 2), sometimes referred to as "OverRun"; c) check in each pixel whether the current driver is in ON or OFF state, to avoid incorrect information for a) and b).

In general, such an implementation may be referred to as a smart or intelligent diagnosis or diagnostic whereby, in some examples, current source regulation circuitry 102 is able to detect low or high voltage drop and provide via serial communication interface a bit streaming in which each bit is the information about status of each single pixel. Each bit may be stored in an array, and then each bit may be read from the array in order to determine the operational status (e.g., voltage drop across driver, ON/OFF status, etc.) of each current source for each pixel in the pixel array. The operational status of each current source for each pixel in the pixel array may, alone or together, influence current source regulation circuitry 102 to control the magnitude of supply voltage 110 in order to maintain the voltage drop across each one current source of current source circuitry 106 to within a bounded range of voltage values.

The examples suggested herein may in particular be based on at least one of the following solutions. In particular combinations of the following features could be utilized in order to reach a desired result. The features of the method could be combined with any feature(s) of the device, apparatus or system or vice versa.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Additionally, the following numbered examples demonstrate one or more aspects of the disclosure.

Example 1

A circuit, comprising: monitor circuitry that is configured to, for at least one LED (Light Emitting Diode) driver of a plurality of LED drivers: generate a signal to indicate that a voltage drop across the at least one LED driver is outside of a bounded range of voltage values, wherein the voltage drop is determined based on a drive voltage that is output by the at least one LED driver to source current to an LED that is coupled thereto and a supply voltage that is output by a power supply to each LED driver of the plurality of LED drivers; and controller circuitry that is configured to: receive the signal from the monitor circuitry; and based on the signal, adjust the supply voltage that is output by the power supply to force the voltage drop across the at least one LED driver to within the bounded range of voltage values.

Example 2

The circuit of example 1, wherein the signal represents a condition that the voltage drop across the at least one LED driver is less than or equal to a minimum voltage value of the bounded range of voltage values, and wherein the controller circuitry is configured to: increase magnitude of the supply voltage that is output by the power supply to force the voltage drop across the at least one LED driver to a value within the bounded range of voltage values.

Example 3

The circuit of any one of examples of 1-2, wherein the signal represents a condition that the voltage drop across the at least one LED driver is greater than or equal to a minimum voltage value of the bounded range of voltage values, and wherein the controller circuitry is configured to: decrease magnitude of the supply voltage that is output by the power supply to force the voltage drop across the at least one LED driver to a value within the bounded range of voltage values.

Example 4

The circuit of any one of examples of 1-3, wherein the monitor circuitry is configured to: generate a status signal that represents a state of the at least one LED driver selected from ON state and OFF state; and the controller circuitry is configured to: receive the status signal from monitor circuitry; and adjust the supply voltage that is output by the power supply on condition that the state of the at least one LED driver is ON state, to force the voltage drop across the at least one LED driver to within the bounded range of voltage values.

Example 5

The circuit of any one of examples of 1-4, wherein each one of the plurality of LED drivers is associated with a corresponding one pixel cell of a plurality of pixel cells that are arranged as a multi-dimensional matrix, and an instance of the monitor circuitry is included in each pixel cell of the plurality of pixel cells, and wherein the controller circuitry is configured to: receive an instance of the signal from each instance of the monitor circuitry, wherein each instance of the signal represents a condition that the voltage drop across an LED driver associated with a corresponding instance of the monitor circuitry is one of less than or equal to a minimum voltage value of the bounded range of voltage values and greater than or equal to a maximum voltage value of the bounded range of voltage values; store, in a first register, a bit for each one instance of the signal that represents the condition that an LED driver voltage drop is less than or equal to the minimum voltage value; store, in a second register, a bit for each one instance of the signal that represents the condition that an LED driver voltage drop is greater than or equal to the maximum voltage value; and adjust the supply voltage to a magnitude that is a function of numbers of bits in the first register and of numbers of bit in the second register.

Example 6

The circuit of any one of examples of 1-5, wherein the controller circuitry is configured to receive in parallel the instance of the signal from each instance of the monitor circuitry.

Example 7

The circuit of any one of examples of 1-6, wherein each one of the plurality of LED drivers is associated with a corresponding one pixel cell of a plurality of pixel cells that are arranged as a multi-dimensional matrix, and the monitor circuitry is coupled to each pixel cell of the plurality of pixel cells, and wherein the controller circuitry is configured to: for each LED driver of the plurality of LED drivers, receive an instance of the signal that represents a condition that the voltage drop is one of less than or equal to a minimum voltage value of the bounded range of voltage values and greater than or equal to a maximum voltage value of the bounded range of voltage values; store, in a first register, a bit for each one instance of the signal that represents the condition that an LED driver voltage drop is less than or equal to the minimum voltage value; store, in a second register, a bit for each one instance of the signal that represents the condition that an LED driver voltage drop is greater than or equal to the maximum voltage value; and adjust the supply voltage to a magnitude that is a function of numbers of bits in the first register and of numbers of bit in the second register.

Example 8

The circuit of any one of examples of 1-7, wherein the monitor circuitry is configured to sequentially sense the voltage drop across each LED driver of the plurality of LED drivers.

Example 9

The circuit of any one of examples of 1-8, wherein the monitor circuitry is configured to poll each pixel cell of the plurality of pixels to sense the voltage drop across a particular LED driver of the plurality of LED drivers.

Example 10

The circuit of any of examples of 1-9, wherein the monitor circuitry is configured to select a particular pixel cell of the plurality of pixel cells in response to a command to sense the voltage drop across a corresponding LED driver of the plurality of LED drivers.

Example 11

The circuit of any one of examples of 1-10, wherein the monitor circuit is configured to select a particular pixel cell of the plurality of pixels in response to a command to sense magnitude of current supplied to a corresponding LED to determine whether said current is outside of regulation range.

Example 12

A method, comprising: for at least one LED (Light Emitting Diode) driver of a plurality of LED drivers, determining a voltage drop across the at least one LED driver from a drive voltage that is output by the at least one LED driver to source current to an LED that is coupled thereto and a supply voltage that is output by a power supply to each LED driver of the plurality of LED drivers; and based on the determining, adjusting the supply voltage that is output by the power supply to force the voltage drop across the at least one LED driver to within a bounded range of voltage values.

Example 13

The method of example 12, wherein the signal represents a condition that the voltage drop across the at least one LED driver is less than or equal to a minimum voltage value of the bounded range of voltage values, and wherein the method further comprises: increasing magnitude of the supply voltage that is output by the power supply to force the voltage drop across the at least one LED driver to a value within the bounded range of voltage values.

Example 14

The method of any one of examples of 12-13, wherein the signal represents a condition that the voltage drop across the at least one LED driver is greater than or equal to a maximum voltage value of the bounded range of voltage values, and wherein the method further comprises: decreasing magnitude of the supply voltage that is output by the power supply to force the voltage drop across the at least one LED driver to a value within the bounded range of voltage values.

Example 15

The method of any one of examples of 12-14, further comprising: adjusting the supply voltage that is output by the power supply on condition that a state of the at least one LED driver is ON state, to force the voltage drop across the at least one LED driver to within the bounded range of voltage values.

Example 16

The method of any one of examples of 12-15, further comprising: determining a voltage drop across each LED driver of the plurality of LED drivers; reading, from a first register, number of bits of a type in the first register, wherein each bit of the type in the first register represents an instance of an LED driver voltage drop that is less than or equal to a minimum voltage value of the bounded range of voltage values; reading, from a second register, number of bits of a type in the second register, wherein each bit of the type in the second register represents an instance of an LED driver voltage drop that is greater than or equal to a maximum voltage value of the bounded range of voltage values; and adjusting the supply voltage to a magnitude that is a function of number of bits in the first register and of number of bits in the second register.

Example 17

The method of any one of examples of 12-16, further comprising determining in parallel the voltage drop across each LED driver of the plurality of LED drivers.

Example 18

The method of any one of examples of 12-17, further comprising sequentially determining the voltage drop across each LED driver of the plurality of LED drivers.

Example 19

The method of any one of examples of 12-18, further comprising selecting, in response to a command, a particular LED driver of the plurality of LED drivers to one of determine the voltage drop across the particular LED driver and determine whether current sourced by the particular LED driver is outside of regulation range.

Example 20

A circuit, comprising: monitor circuitry that is configured to, for at least one LED (Light Emitting Diode) driver of a plurality of LED drivers: generate a signal to indicate that a voltage drop across the at least one LED driver is outside of a bounded range of voltage values, wherein the voltage drop is determined based on a drive voltage that is output by the at least one LED driver to source current to an LED that is coupled thereto and a supply voltage that is output by a power supply to each LED driver of the plurality of LED drivers; and controller circuitry that is configured to: receive the signal from the monitor circuitry; determine that the signal one of represents a condition that the voltage drop across the at least one LED driver is greater than or equal to a minimum voltage value of the bounded range of voltage values and represents a condition that the voltage drop across the at least one LED driver is greater than or equal to a maximum voltage value of the bounded range of voltage values; and based on the signal, one of increase magnitude of the supply voltage that is output by the power supply to force the voltage drop across the at least one LED driver to a value within the bounded range of voltage values and decrease magnitude of the supply voltage that is output by the power supply to force the voltage drop across the at least one LED driver to a value within the bounded range of voltage values.

Various examples of the disclosure have been described. Any combination of the described systems, operations, or functions is contemplated. These and other examples are within the scope of the following claims.

What is claimed is:
1. A circuit, comprising:
monitor circuitry that is configured to, for at least one LED (Light Emitting Diode) driver of a plurality of LED drivers:
generate a signal to indicate that a voltage drop across the at least one LED driver is outside of a bounded range of voltage values, wherein the voltage drop is determined based on a drive voltage that is output by the at least one LED driver to source current to an LED that is coupled thereto and a supply voltage that is output by a power supply to each LED driver of the plurality of LED drivers, and wherein the signal represents a condition that the voltage drop across the at least one LED driver is less than or equal to a minimum voltage value of the bounded range of voltage values or a condition that the voltage drop across the at least one LED driver is greater than or equal to a maximum voltage value of the bounded range of voltage values; and controller circuitry that is configured to:
receive the signal from the monitor circuitry; and
based on the signal, increase or decrease magnitude of the supply voltage that is output by the power supply to force the voltage drop across the at least one LED driver to a voltage value within the bounded range of voltage values.

2. The circuit of claim 1, wherein
the monitor circuitry is configured to:
generate a status signal that represents a state of the at least one LED driver selected from ON state and OFF state; and the controller circuitry is configured to:
receive the status signal from monitor circuitry; and
adjust the supply voltage that is output by the power supply on condition that the state of the at least one LED driver is ON state, to force the voltage drop across the at least one LED driver to within the bounded range of voltage values.

3. The circuit of claim 1, wherein each one of the plurality of LED drivers is associated with a corresponding one pixel cell of a plurality of pixel cells that are arranged as a multi-dimensional matrix, and an instance of the monitor circuitry is included in each pixel cell of the plurality of pixel cells, and wherein the controller circuitry is configured to:
receive an instance of the signal from each instance of the monitor circuitry, wherein each instance of the signal represents the condition that the voltage drop across an LED driver associated with a corresponding instance of the monitor circuitry is one of less than or equal to the minimum voltage value of the bounded range of voltage values and greater than or equal to the maximum voltage value of the bounded range of voltage values;
store, in a first register, a bit for each one instance of the signal that represents the condition that an LED driver voltage drop is less than or equal to the minimum voltage value;
store, in a second register, a bit for each one instance of the signal that represents the condition that an LED driver voltage drop is greater than or equal to the maximum voltage value; and
adjust the supply voltage to a magnitude that is a function of numbers of bits in the first register and of numbers of bit in the second register.

4. The circuit of claim 3, wherein the controller circuitry is configured to receive in parallel the instance of the signal from each instance of the monitor circuitry.

5. The circuit of claim 1, wherein each one of the plurality of LED drivers is associated with a corresponding one pixel cell of a plurality of pixel cells that are arranged as a multi-dimensional matrix, and the monitor circuitry is coupled to each pixel cell of the plurality of pixel cells, and wherein the controller circuitry is configured to:
for each LED driver of the plurality of LED drivers,
receive an instance of the signal that represents the condition that the voltage drop is one of less than or equal to the minimum voltage value of the bounded range of voltage values and greater than or equal to the maximum voltage value of the bounded range of voltage values;
store, in a first register, a bit for each one instance of the signal that represents the condition that an LED driver voltage drop is less than or equal to the minimum voltage value;
store, in a second register, a bit for each one instance of the signal that represents the condition that an LED driver voltage drop is greater than or equal to the maximum voltage value; and
adjust the supply voltage to a magnitude that is a function of numbers of bits in the first register and of numbers of bit in the second register.

6. The circuit of claim 5, wherein the monitor circuitry is configured to sequentially sense the voltage drop across each LED driver of the plurality of LED drivers.

7. The circuit of claim 5, wherein the monitor circuitry is configured to poll each pixel cell of the plurality of pixels to sense the voltage drop across a particular LED driver of the plurality of LED drivers.

8. The circuit of claim 5, wherein the monitor circuitry is configured to select a particular pixel cell of the plurality of pixel cells in response to a command to sense the voltage drop across a corresponding LED driver of the plurality of LED drivers.

9. The circuit of claim 5, wherein the monitor circuit is configured to select a particular pixel cell of the plurality of pixels in response to a command to sense magnitude of current supplied to a corresponding LED to determine whether said current is outside of regulation range.

10. A method, comprising:
for at least one LED (Light Emitting Diode) driver of a plurality of LED drivers,
determining a voltage drop across the at least one LED driver from a drive voltage that is output by the at least one LED driver to source current to an LED that is coupled thereto and a supply voltage that is output by a power supply to each LED driver of the plurality of LED drivers, wherein the voltage drop is determined as less than or equal to a minimum voltage value of a bounded range of voltage values or determined as greater than or equal to a maximum voltage value of the bounded range of voltage values; and
based on the determining, increasing or decreasing magnitude of the supply voltage that is output by the power supply to force the voltage drop across the at least one LED driver to within the bounded range of voltage values.

11. The method of claim 10, further comprising:
adjusting the supply voltage that is output by the power supply on condition that a state of the at least one LED driver is ON state, to force the voltage drop across the at least one LED driver to within the bounded range of voltage values.

12. The method of claim 10, further comprising:
determining a voltage drop across each LED driver of the plurality of LED drivers;
reading, from a first register, number of bits of a type in the first register, wherein each bit of the type in the first register represents an instance of an LED driver voltage drop that is less than or equal to the minimum voltage value of the bounded range of voltage values;
reading, from a second register, number of bits of a type in the second register, wherein each bit of the type in the second register represents an instance of an LED driver voltage drop that is greater than or equal to the maximum voltage value of the bounded range of voltage values; and adjusting the supply voltage to a magnitude that is a function of number of bits in the first register and of number of bits in the second register.

13. The method of claim 12, further comprising determining in parallel the voltage drop across each LED driver of the plurality of LED drivers.

14. The method of claim 12, further comprising sequentially determining the voltage drop across each LED driver of the plurality of LED drivers.

15. The method of claim 12, further comprising selecting, in response to a command, a particular LED driver of the plurality of LED drivers to one of determine the voltage drop across the particular LED driver and determine whether current sourced by the particular LED driver is outside of regulation range.

16. A circuit, comprising:

monitor circuitry that is configured to, for at least one LED (Light Emitting Diode) driver of a plurality of LED drivers:

generate a signal to indicate that a voltage drop across the at least one LED driver is outside of a bounded range of voltage values, wherein the voltage drop is determined based on a drive voltage that is output by the at least one LED driver to source current to an LED that is coupled thereto and a supply voltage that is output by a power supply to each LED driver of the plurality of LED drivers; and controller circuitry that is configured to:
receive the signal from the monitor circuitry;
determine that the signal one of represents a condition that the voltage drop across the at least one LED driver is greater than or equal to a minimum voltage value of the bounded range of voltage values and represents a condition that the voltage drop across the at least one LED driver is greater than or equal to a maximum voltage value of the bounded range of voltage values; and based on the signal, one of increase magnitude of the supply voltage that is output by the power supply to force the voltage drop across the at least one LED driver to a value within the bounded range of voltage values and decrease magnitude of the supply voltage that is output by the power supply to force the voltage drop across the at least one LED driver to a value within the bounded range of voltage values.

* * * * *